United States Patent [19]

Stine et al.

[11] Patent Number: 5,193,410
[45] Date of Patent: Mar. 16, 1993

[54] RANGE SECTION PROTECTION VALVE ASSEMBLY

[75] Inventors: Alan C. Stine, Kalamazoo, Mich.; Terry F. Terwilliger, Littleton, Colo.; Joseph D. Reynolds, Climax, Mich.; Michael J. Huggins, Kalamazoo, Mich.; Mark A. Hirsch, Vicksburg, Mich.

[73] Assignee: Eaton Corporation, Cleveland, Ohio

[21] Appl. No.: 824,925

[22] Filed: Jan. 23, 1992

[51] Int. Cl.$^5$ ............................................. F16H 59/00
[52] U.S. Cl. ................................... 74/336 R; 74/335
[58] Field of Search ............................... 74/335, 336 R

[56] References Cited

U.S. PATENT DOCUMENTS

| | | | |
|---|---|---|---|
| 4,685,357 | 8/1987 | Sawada et al. | 74/867 |
| 4,748,863 | 6/1988 | McNinch, Jr. | 74/335 |
| 4,827,802 | 5/1989 | Marier | 74/335 X |
| 4,974,474 | 12/1990 | Newbigging | 74/867 |
| 5,092,187 | 3/1992 | Irwin | 74/867 X |
| 5,101,942 | 4/1992 | Prüss et al. | 74/335 X |

Primary Examiner—Richard M. Lorence
Assistant Examiner—Benjamin Levi
Attorney, Agent, or Firm—H. D. Gordon

[57] ABSTRACT

A shift valve (312) assembly for an auxiliary transmission section (14) shift control system (300)/method is provided which will prevent auxiliary section sychronized clutch (922, 128) damage, and will complete the auxiliary section shaft, if the main transmission section (12) is engaged during an auxiliary section shift into high speed ratio thereof.

25 Claims, 14 Drawing Sheets

RANGE SECTION PROTECTION VALVE ASSEMBLY

BACKGROUND OF THE INVENTION

1. Related Applications

This application is related to copending U.S. Patent applications:

Ser. No. 824,924, entitled AUXILIARY SECTION ACTUATOR CONTROL SYSTEM AND METHOD;

Ser. No. 824,673, entitled INTERLOCK MECHANISM FOR RANGE SECTION SLAVE VALVE;

Ser. No. 824,675, entitled RANGE VALVE PRE-EXHAUST, now U.S. Pat. No. 5,172,604;

Ser. No. 824,961, entitled TWO-STAGE RANGE PISTON/CYLINDER ASSEMBLY;

Ser. No. 824,645, entitled VARIABLE PRESSURE RANGE SECTION ACTUATOR PISTON;

Ser. No. 824,960, entitled DUAL PRESSURE REGULATOR, now abandoned;

Ser. No. 824,672, entitled VARIABLE PRESSURE RANGE SECTION ACTUATOR ASSEMBLY;

Ser. No. 824,957, entitled AUXILIARY SECTION ACTUATOR AIR CONTROL SYSTEM;

Ser. No. 824,638, entitled RANGE SECTION ACTUATOR CONTROL SYSTEM AND METHOD FOR PREVENTING DAMAGE TO RANGE SECTION SYNCHRONIZERS; and Ser. No. 824,956, entitled SYNCHRONIZED SPLITTER SECTION PROTECTION SYSTEM/METHOD;

all assigned to the same assignee, Eaton Corporation, and filed the same day, Jan. 23, 1992, as this application.

FIELD OF THE INVENTION

The present invention relates to a valve assembly for controlling the auxiliary section actuator of a vehicular compound transmission. In particular, the present invention relates to pressurized fluid (pneumatic) slave valve assembly for controlling the engagement of auxiliary section synchronized jaw clutches in compound transmissions of the type comprising one or more multiple speed auxiliary transmission sections connected in series with a multiple speed main transmission section. More particularly, the present invention relates to a pressurized fluid slave valve assembly for protecting the auxiliary section synchronized jaw clutches, especially the auxiliary section high speed synchronized jaw clutches, of a compound heavy duty vehicular transmission during a compound shift.

DESCRIPTION OF THE PRIOR ART

Compound change gear transmissions of the type having one or more auxiliary sections connected in series with a main transmission section are very well known in the prior art. Such transmissions are typically associated with heavy duty vehicles such as large trucks, tractor/semi-trailers, and the like. Briefly, by utilizing main and auxiliary transmission sections connected in series, assuming proper relative sizing of the ratio steps, the total of available transmission ratios is equal to the product of the main and auxiliary section ratios. By way of example, at least in theory, a compound change gear transmission comprising a four (4) speed main section connected in series with a three (3) speed auxiliary section will provide twelve (4×3=12) available ratios.

Auxiliary transmission sections are of three general types: range type, splitter type or combined range/splitter type.

In compound transmissions having a range type auxiliary section, the range section ratio step or steps are greater than the total ratio coverage of the main transmission section and the main section is shifted progressively through its ratios in each range. Examples of compound transmissions having range type auxiliary sections may be seen by reference to U.S. Pat. Nos. 4,974,474; 4,964,313, 4,920,815; 3,105,395; 2,637,222 and 2,637,221, the disclosures of which are hereby incorporated by reference.

Assignee's well known RT/RTO 11609 and RT/RTO 11610 "Roadranger" transmissions are examples of a "(4+1)×(2)", nine speed and "(5)×(2)" ten speed heavy duty range type transmissions.

In compound transmissions having a splitter type auxiliary section, the ratio steps of the splitter auxiliary section are less than the ratio steps of the main transmission section and each main section ratio is split, or subdivided, by the splitter section. Examples of compound change gear transmissions having splitter type auxiliary sections may be seen by reference to U.S. Pat. Nos. 4,290,515; 3,799,002; 4,440,037 and 4,527,447, the disclosures of which are hereby incorporated by reference.

In a combined range and splitter type auxiliary section, or sections, both range and splitter type ratios are provided allowing the main section to be progressively shifted through its ratios in at least two ranges and also allowing the main section ratios to be split in at least one range.

One example of a compound transmission having a single combined range/splitter type auxiliary section may be seen by reference to U.S. Pat. Nos. 3,283,613; 3,648,546, the disclosures of which are hereby incorporated by reference. A three gear layer, four-speed combined splitter/range type auxiliary section may be seen by reference to U.S. Pat. No. 4,754,665, the disclosure of which is hereby incorporated by reference. Assignee's well known RT/RTO 11613 and RT/RTO 14718 "Eaton Roadranger" transmissions are examples of a "(4+1)×(3)" thirteen-speed and a "(4+1)×(4)" eighteen-speed combined range/splitter type transmission.

Another example is the "Ecosplit" model of transmission sold by Zahnradfabrik Friedrichshafen Aktiengeseushaft. of Friedrichshafen, Federal Republich of Germany which utilizes a separate splitter auxiliary section in front of, and a separate range auxiliary section behind, the main transmission section.

It should be noted that the terms main and auxiliary sections are relative and that if the designations of the main and auxiliary sections are reversed, the type of auxiliary section (either range or splitter) will also be reversed. In other words, given what is conventionally considered a four-speed main section with two-speed range type auxiliary section, if the normally designated auxiliary is considered the main section, the normally designated main section would be considered a four-speed splitter type auxiliary section therefor. By generally accepted transmission industry convention, and as used in this description of the invention, the main transmission section of a compound transmission is that section which contains the largest (or at least no less) number of forward speed ratios, which allows section of a neutral position, which contains the reverse ratio(s)

and/or which is shifted (in manual or semiautomatic transmissions) by manipulation of a shift bar or shift rail or shift shaft/shift finger assembly as opposed to master/slave valve/cylinder arrangements or the like.

In compound transmissions of the range or the combined range/splitter or splitter/range types, the main transmission section is typically shifted by means of a shift bar housing assembly, or single shift shaft assembly, controlled by a manually operated shift lever or the like and the auxiliary range section is shifted, in "repeat H" type transmissions, by means of button or switch, usually manually operated, which controls a remote slave valve/actuator mechanism. In so-called "double H" or "one and one-half H" type controls, the range is shifted by switches responsive to positioning of the shift lever. Double H type controls are well known in the prior art as may be seen by reference to U.S. Pat. Nos. 4,633,725 and 4,275,612, the disclosures of which are incorporated hereby by reference.

As the range section often utilizes synchronized jaw clutches, to provide acceptable shift quality and prevent undue wear and/or damage to the range section synchronized jaw clutches, it has been an object of the prior art to provide devices to assure that a range shift be initiated and hopefully completed while the main transmission section is in neutral.

In view of the above, the prior art compound range type transmissions usually include a control system, usually a pneumatic control system, including interlock devices, which allowed a range shift to be preselected by use of a selector button or switch at a master control valve but not initiated until the main transmission section is shifted to, or at least towards, the neutral condition. Such systems typically utilized interlocks of the mechanical type on the range section actuator mechanical linkage which physically prevented movement of the range section shift fork until the main section shifted into neutral or of the type wherein the valve (often called the "slave valve") supplying pressurized air to the range section pistons is either disabled or not provided with pressurized fluid until a shift to main section neutral is sensed, or is only activated and provided with pressurized fluid while the main section is shifted to and remains in neutral. Examples of such transmissions and the control systems therefor may be seen by reference to U.S. Pat. Nos. 2,654,268; 3,138,965 and 4,060,005, the disclosures of which are hereby incorporated by reference. Transmissions using range section control valves (supply and/or exhaust) which are interlocked until a main section shift to neutral occurs may be seen by reference to U.S. Pat. Nos. 3,229,551; 4,450,869; 4,793,378 and 4,974,474, the disclosures of which are incorporated by reference.

While the prior art systems do provide considerable protection for the range section synchronizers by preventing initiation of a range shift until the main section is shifted into neutral, they are not totally satisfactory as while they assure that a range section shift will not initiate until the main section is in neutral, they do not prevent the condition wherein the main section shift is faster than (i.e. "beats") the range shift. As is well known, under certain conditions, if the range synchronized clutch attempts to engage while main section is engaged, a portion of the engine torque is transferred to the vehicular drive wheels entirely by the engaged synchronizer friction surfaces and the synchronizer friction members can be rapidly damaged. In such condition, the range synchronizers, especially the direct or high speed range synchronizer may be damaged or destroyed relatively quickly. In the event of an unintended attempt to make a range only shift, such damage may occur within about two (2.0) seconds.

Transmissions utilizing mechanical interlock devices, of both the rigid and the resilient type, may be seen by reference to U.S. Pat. Nos. 4,974,474; 4,944,197 and 4,296,642, the disclosures of which are hereby incorporated by reference. Such devices typically locked the range clutch into high or low position while the main section is not in neutral and/or locked the main section in neutral if the range clutch was not engaged in the high or low speed position thereof. While these systems will, when operating properly, prevent damage to the range synchronizers caused by attempting to engage a range clutch while the main section is not in neutral, they were not totally satisfactory as (i) a fast main section shift can result in the auxiliary section being locked in an undesirable ratio, (ii) if a range clutch is hung up on the blocker the main section cannot be engaged to manipulate the clutches, (iii) resilient devices may not properly interlock or may bind, (iv) considerable wear and stress may be caused to the interlock and/or shift actuator members and/or (v) with wear, friction locks of the interlock mechanisms may occur.

SUMMARY OF THE INVENTION

In accordance with the present invention, the drawbacks of the prior art are minimized or overcome by the provision of an auxiliary section actuator control system including a slave valve assembly which will protect the auxiliary section synchronizers if the main section is engaged prior to completion of an attempted auxiliary section shift and which will also allow the attempted auxiliary section shift to be completed upon the jaw clutch members of the engaging synchronized clutch achieving a substantially synchronous rotation.

The above is accomplished by providing a valve assembly having means for sensing if the main transmission section is in a neutral or not neutral condition, and is responsive to cause the selected range clutch, usually the high speed ratio range clutch, to be applied with a first, relatively high force if the main section is in neutral and to be applied with a second, relatively lower force if the main section is not in neutral.

The relatively high force is obtained by pressurizing the larger face of a differential area piston while the lower force is obtained by pressurizing both faces of the differential area piston.

The invention is particularly well suited for controlling the engagement of the range high speed or direct synchronized clutch. Protection for the low speed or reduction synchronized auxiliary section clutch is usually not required as when shifting into auxiliary low, torque across the synchronizer friction surfaces will tend, especially in pin type synchronizers, to cause unblocking of a blocked synchronizer to cause rapid engagement of the clutch.

The valve assembly of the present invention is effective to control the pressurizing and exhausting of a first larger area piston face chamber and a second smaller area piston face chamber in a differential area piston type shift actuator. The valve is constantly biased to a first position for engaging a high speed auxiliary section ratio with a relatively high force by pressurizing the first and exhausting the second chamber and is movable by selector actuated pilot means to a second position for engaging a low speed auxiliary section ratio with a relatively high force by pressurizing the second and exhausting the first chamber. Override means are provided to move the valve from the first to a third position wherein both chambers are pressurized upon sensing (i) the high-speed ratio is being engaged and (ii) and the main transmission section is not in neutral. In the third position of the valve, the high-speed ratio clutch will be urged into engagement with a relatively smaller force.

Accordingly, it is an object of the present invention to provide a new and improved auxiliary section (range) shifting control system for a compound transmission of the type utilizing synchronized jaw clutches in the auxiliary sections thereof.

Another object of the present invention is to provide pressurized fluid actuated auxiliary section actuator control system, including an improved valve assembly, for urging engagement of a selected auxiliary section synchronized clutch (usually the direct or high speed range ratio) with a relatively high force if the main transmission section is not engaged or with a relatively low force if the main transmission section is engaged (not neutral).

These and other objects and advantages of the present invention will become apparent from a reading of the detailed description of the preferred embodiment taken in connection with the attached drawings.

DESCRIPTION OF THE PREFERRED EMBODIMENT

Figure 1:
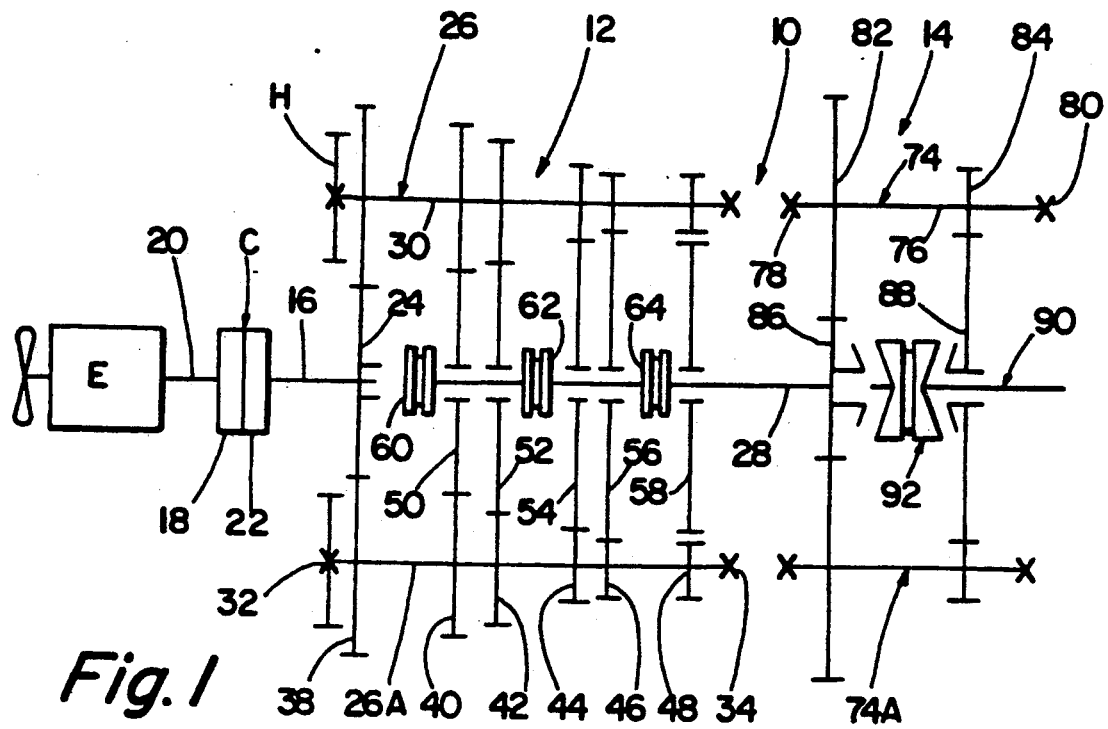
FIG. 1 is a schematic illustration of a compound transmission having a range type auxiliary section and utilizing the pneumatic control system of the present invention.

Certain terminology will be used in the following description for convenience in reference only and will not be limiting. The words "upwardly", "downwardly", "rightwardly", and "leftwardly" will designate directions in the drawings to which reference is made. The words "forward", "rearward", will refer respectively to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a positive, jaw-type clutch assembly utilized to nonrotatably couple a selected gear to a shaft by means of a positive clutch in which attempted engagement of said clutch is prevented until the members of the clutch are at substantially synchronous rotation and relatively large capacity friction means are utilized with the clutch members and are sufficient, upon initiation of a clutch engagement, to cause the clutch members and all members rotating therewith to rotate at substantially synchronous speed.

Figure 2:
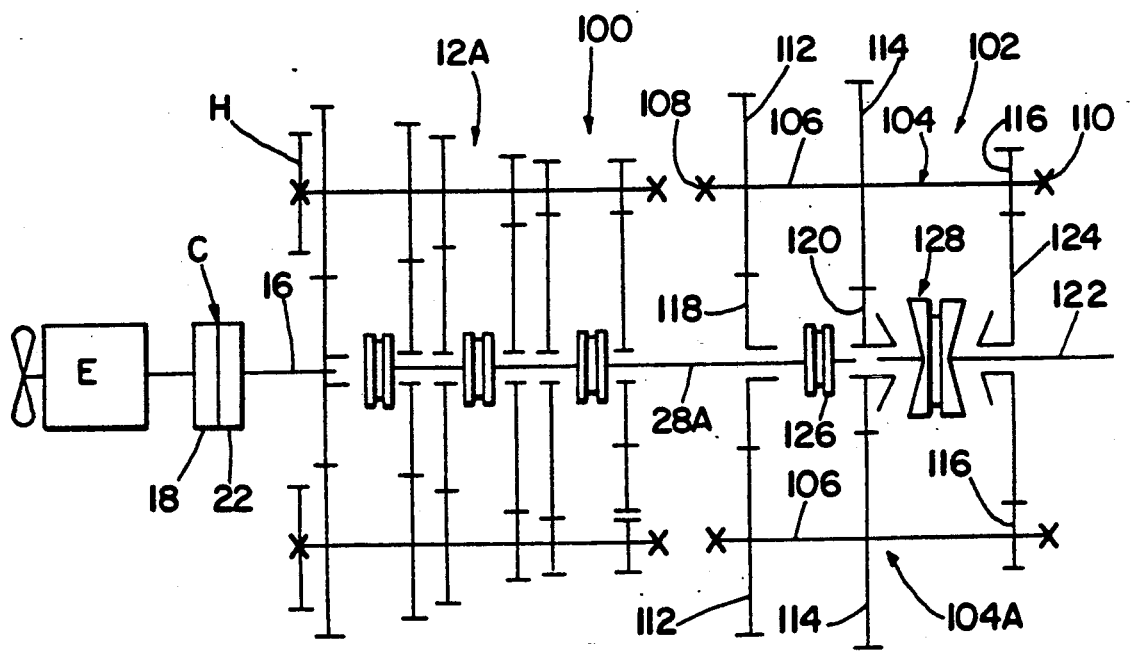
FIG. 2 is a schematic illustration of a compound transmission having a combined splitter/range type auxiliary section with which the pneumatic control system of the present invention is particularly useful.

The terms "neutral" and "not engaged" are used interchangeably and refer to a main transmission section condition wherein torque is not transferred from the transmission input shaft to the mainshaft (in transmissions of the general type illustrated in FIGS. 1 and 2). The terms "not neutral" and "engaged" are used interchangeably and refer to a main transmission section condition wherein a main section drive ratio is engaged and drive torque is transferred from the transmission input shaft to the main shaft (in transmissions of the general type illustrated in FIGS. 1 and 2).

The term "high speed" ratio refers to that ratio of a transmission section wherein the rotational speed of the output is greatest for a given input rotational speed.

Figure 1A:
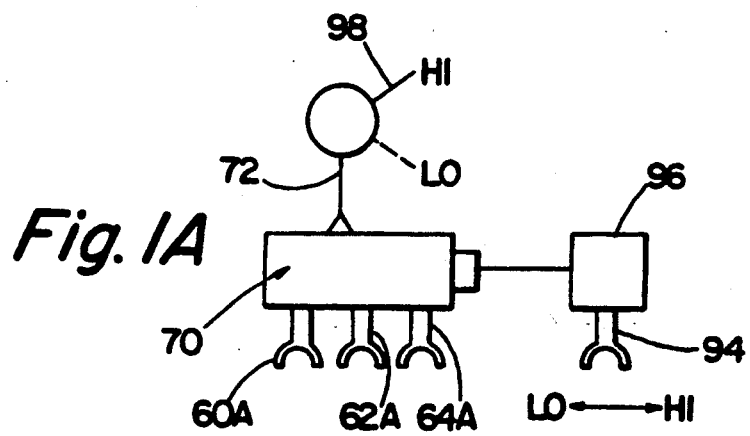
FIG. 1A is a schematic illustration of the shifting mechanisms of the transmission of FIG. 1.
Figure 1B:
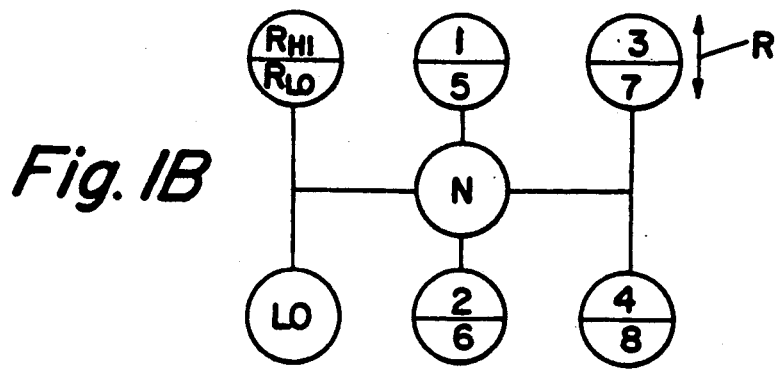
FIG. 1B is a schematic illustration of the "repeat H" type shift pattern of the transmission of FIG. 1.
Figure 1C:
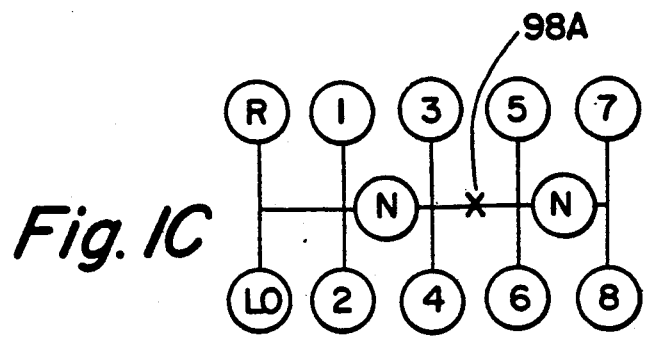
FIG. 1C is a schematic illustration of a "double H" type shift pattern for the transmission of FIG. 1.

Referring to FIGS. 1, 1A and 1B, a range type compound transmission 10 is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks 60A, 62A and 64A, respectively, associated with the shift housing assembly 70, as well known in the prior art. Clutch collars 60, 62 and 64 may be of the well known synchronized or non-synchronized double acting jaw clutch type.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and is not usually utilized in the high transmission range. Accordingly, while main transmission section 12 does provide five forward speeds, it is usually referred to as a "four plus one" or "(4+1)" main section as only four of the forward speeds are compounded by the auxiliary range transmission section 14 utilized therewith.

Jaw clutches 60, 62, and 64 are three-position clutches in that they may be positioned in the centered, nonengaged position as illustrated, or in a fully rightwardly engaged or fully leftwardly engaged position by means of a shift lever 72. As is well known, only one of the clutches 60, 62 and 64 is engageable at a given time and main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 which is fixed for rotation with mainshaft 28 while auxiliary section countershaft gears 84 are constantly meshed with output gear 88 which surrounds transmission output shaft 90.

A two-position synchronized jaw clutch assembly 92, which is axially positioned by means of shift fork 94 and the range section shifting actuator assembly 96, is provided for clutching either gear 88 to output shaft 90 for low range operation or gear 86 to output shaft 90 for direct or high range operation of the compound transmission 10. The "repeat H" type shift pattern for compound range type transmission 10 is schematically illustrated in FIG. 1B. Selection and/or preselection of low or high range operation of the transmission 10 is by means of an operator actuated switch or button 98 which is usually located at the shift lever 72.

Although the range type auxiliary section 14 is illustrated as a two-speed section utilizing spur or helical type gearing, it is understood that the present invention is also applicable to range type transmissions utilizing combined splitter/range type auxiliary sections, having three or more selectable range ratios and/or utilizing planetary type gearing. Also, as indicated above, any one or more of clutches 60, 62 or 64 may be of the synchronized jaw clutch type and transmission sections 12 and/or 14 may be of the single countershaft type.

The main transmission section 12 is controlled by axial movement of at least one shift rail or shift shaft contained within the shift bar housing 70 and controlled by operation of the shift lever 72. As is known, shift lever 72 may be mounted directly to, or remotely from, the transmission. Devices of this type are well known in the prior art and may be seen by reference to U.S. Pat. No. 4,621,537, the disclosure of which is hereby incorporated by reference. The range section is controlled by operation of button 98, or a position switch 98A in the case of a "double H" type control, both as well known in the prior art. Shift bar housing 70 may also be of the more conventional multiple shift rail type, well known in the prior art as may be seen by reference to U.S. Pat. Nos. 4,782,719; 4,738,863; 4,722,237 and 4,614,126, the disclosures of which are incorporated by reference.

The control system of the present invention is equally applicable to compound transmissions having range, combined range/splitter or splitter/range type auxiliary sections.

Referring to FIG. 2, compound change gear mechanical transmission 100 is an eighteen forward speed transmission comprising a main transmission section 12A, identical, or substantially identical, to main transmission section 12 described above in reference to prior art transmission 10. Main transmission section 12A of transmission 100 differs from main transmission section 12 of transmission 10 only in that main shaft 8A extends slightly further into the auxiliary transmission section 102 than does main shaft 28 extend into auxiliary transmission section 14. In view of the substantially identical structure of main transmission sections 12 and 12A, main transmission section 12A will not be described again in detail.

Auxiliary transmission section 102 includes two substantially identical auxiliary countershaft assemblies 104 and 104A, each comprising an auxiliary countershaft 106 supported by bearings 108 and 110 in housing H and carrying three auxiliary section countershaft gears 112, 114 and 116 fixed for rotation therewith. Auxiliary countershaft gears 112 are constantly meshed with and support auxiliary section splitter gear 118 which surrounds mainshaft 28A. Auxiliary countershaft gears 114 are constantly meshed with and support auxiliary section splitter/range gear 120 which surrounds the output shaft 122 at the end thereof adjacent the coaxial end of mainshaft 28A. Auxiliary section countershaft gears 116 constantly mesh and support auxiliary section range gear 124, which surrounds the output shaft 122. Accordingly, auxiliary section countershaft gears 112 and splitter gear 118 define a first gear layer, auxiliary section countershaft gears 114 and splitter/range gear 120 define a second gear layer and auxiliary section countershaft gears 116 and range gear 124 define a third layer, or gear group of the combined splitter and range type auxiliary transmission section 102.

A sliding two position jaw clutch collar 126 is utilized to selectively couple either the splitter gear 118 or the splitter/range gear 120 to the mainshaft 28A, while a two position synchronized assembly 128 is utilized to selectively couple the splitter/range gear 120 or the range gear 124 to the output shaft 122. The structure and function of double acting sliding jaw clutch collar 126 is substantially identical to the structure and function of sliding clutch collars 60, 62 and 64 utilized in connection with transmission 10 while the structure and function of double acting synchronized clutch assembly 128 is substantially identical to the structure and function of synchronized clutch assembly 92 utilized in connection with transmission 10. Synchronized clutch assemblies such as assemblies 92 and 128 are well known in the prior art and examples thereof may be seen by reference to U.S. Pat. Nos. 4,462,489; 4,125,179 and 2,667,955, the disclosures of all of which are incorporated by reference.

Such clutches typically include a pair of axially engageable jaw clutch members, a sensor/blocker device for sensing nonsynchronous rotation of the jaw clutch members and blocking axial engagement thereof and a pair of friction surfaces, often conical, which are urged into contact to frictionally connect the jaw clutch members to cause substantially synchronous rotation thereof. During attempted engagement of such assemblies, assuming a substantial nonsynchronous condition, the clutch will assume a blocked position wherein the blocker device prevents axial engagement of the jaw clutch members and the friction surfaces are engaged under force. If the clutch assembly remains in the blocked position under a high axial engagement force while the main transmission is engaged for an extended period of time, excessive torque loading can damage and/or destroy the friction surfaces.

Figure 3A:
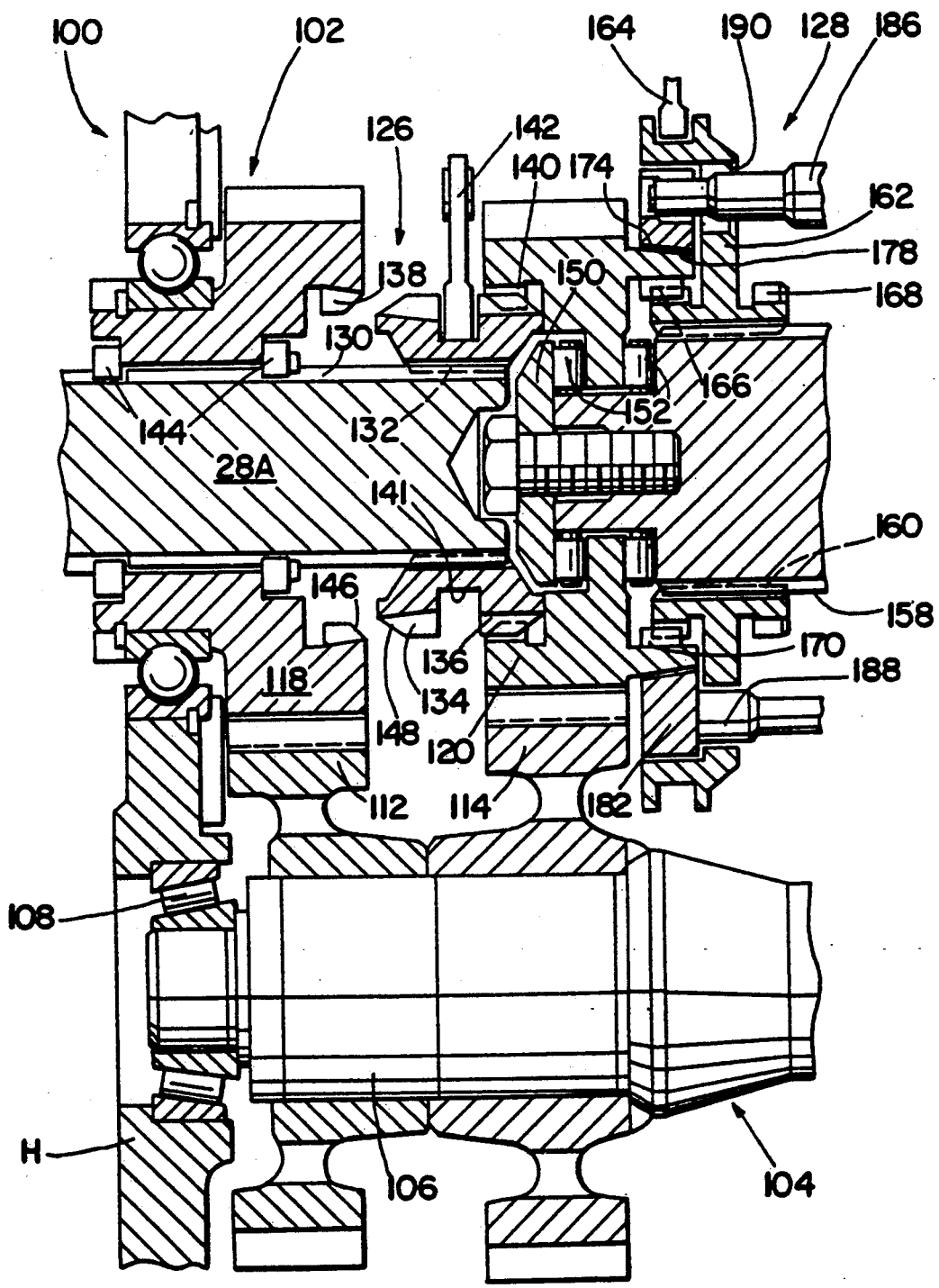
FIGS. 3 (A and B) is a partial view, in cross-section, of the auxiliary section 102 of transmission 100.
Figure 3B:
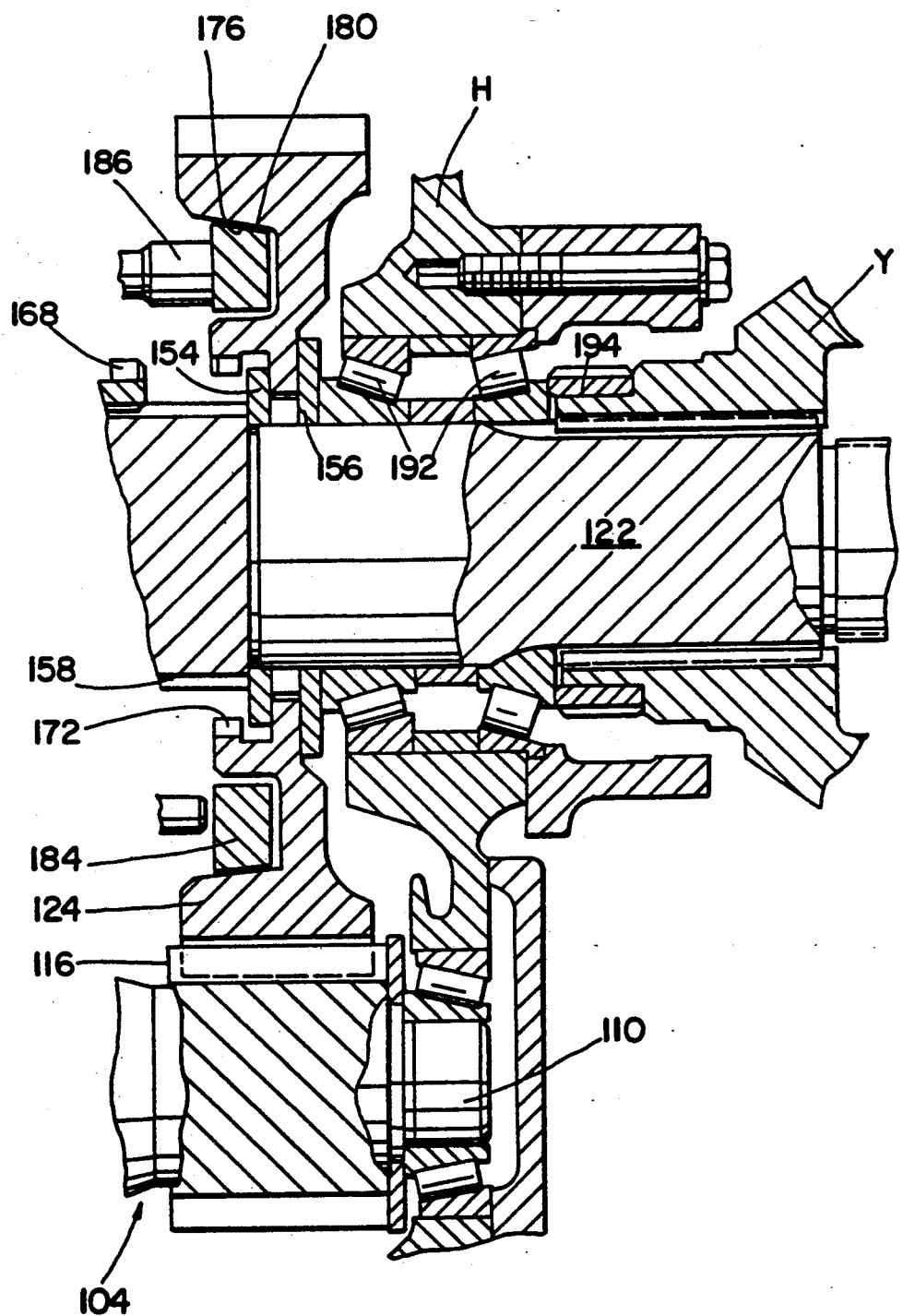

The detailed structure of the preferred embodiment of auxiliary section 102 is illustrated in FIGS. 3A and 3B, wherein it may be seen that the rearward end of mainshaft 28A extending into the auxiliary transmission section 102 is provided with external splines 130 which mate with internal splines 132 provided on clutch collar 126 for rotationally coupling clutch collar 126 to the mainshaft 28A while allowing relative axial movement therebetween. The clutch collar 126 is provided with clutch teeth 134 and 136 for selective axial engagement with clutch teeth 138 and 140 provided on gears 118 and 120, respectively. The clutch collar 126 is also provided with a groove 141 for receipt of a shift fork 142.

Gear 118 surrounds mainshaft 28A and is normally free to rotate relative thereto and is axially retained relative to the mainshaft 28A by means of retainers 144. Clutch teeth 136 and 138 present tapered surfaces 146 and 148 which are inclined at about 35° relative to the axis of the mainshaft 28A which provides an advantageous interaction tending to resist nonsynchronous engagement and also tending to cause a synchronous rotation as is described in greater detail in U.S. Pat. No. 3,265,173, the disclosure of which is hereby incorporated by reference. Clutch teeth 136 and 140 are provided with similar complementary tapered surfaces.

Splitter/range gear 120 is rotatably supported at the inward end 150 of output shaft 122 by means of a pair of thrust bearings while range gear 124 surrounds the output shaft 122 and is axially retained thereon by means of thrust washers. Located axially between gears 120 and 124, and rotationally fixed to output shaft 122 by means of external splines and internal splines, is the double acting two position synchronized clutch assembly 128. Many of the well known synchronized positive clutch structures are suitable for use in the auxiliary transmission section of the present invention. The synchronized clutch assembly 128 illustrated is of the pin type described in above mentioned U.S. Pat. No. 4,462,489. Briefly, the synchronized clutch assembly 128 includes a slidable jaw clutch member 162 axially positioned by a shift fork 164 and carrying clutch teeth 166 and 168, respectively, for axial engagement with clutch teeth 170 and 172, respectively, carried by gears 120 and 124, respectively. Gears 120 and 124 define cone friction surfaces 174 and 176, respectively, for frictional synchronizing engagement with matching frictional cone surfaces 178 and 180, respectively, carried by the friction rings 182 and 184, respectively, of the synchronized clutch assembly. Blocker pins 186 and 188 are rotationally fixed to the friction rings 184 and 182, respectively, and interact with blocker openings 190 carried by the sliding member 162 to provide the blocking function as is well known in the prior art. Synchronizing assembly 128 may also include a plurality of spring pins (not shown) for providing initial engagement of the conical friction surfaces at the initiation of a clutch engagement operation.

Output shaft 122 is supported by bearings 192 in housing H and extends therefrom for attachment of a yolk member Y or the like which typically forms a portion of a universal joint for driving a propeller shaft to a differential or the like. The output shaft 122 may also carry a speedometer gear 194 and/or various sealing elements (not shown).

As may be seen by reference to FIGS. 2 and 3, by selectively axially positioning both the splitter clutch 126 and the range clutch 128 in the forward and rearward axial positions thereof, four distinct ratios of main shaft rotation to output shaft rotation may be provided. Accordingly, auxiliary transmission section 102 is a 3-layer auxiliary section of the combined range and splitter type providing four selectable speeds or drive ratios between the input (countershaft 28A) and output (output shaft 122) thereof. Transmissions of this type are well known in the prior art and are sold by assignee Eaton Corporation under the trade names "Super 10" and "Super 18" and may be seen in greater detail by reference to U.S. Pat. No. 4,754,665, the disclosure of which is incorporated herein by reference.

Figure 2A:
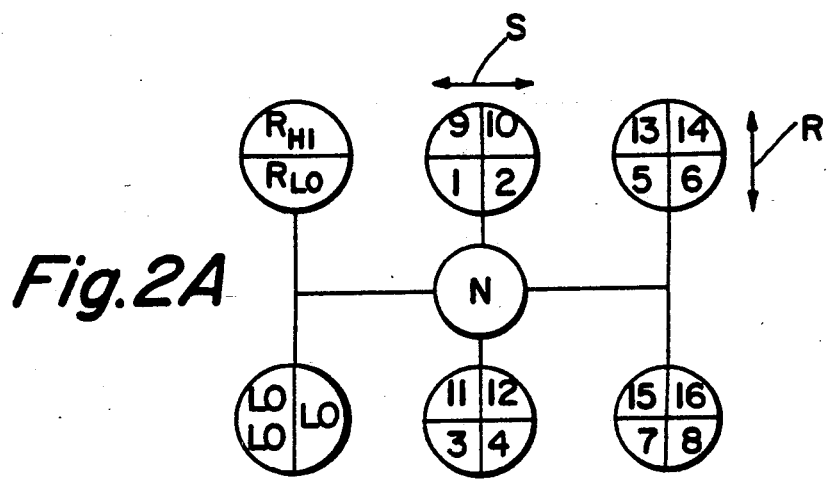
FIG. 2A is a schematic illustration of the shift pattern for the transmission of FIG. 2.

The shift pattern for the transmission 100 is schematically illustrated in FIG. 2A wherein the "S" arrow indicate a splitter shift and the "R" arrow indicates a range shift.

Figure 4:
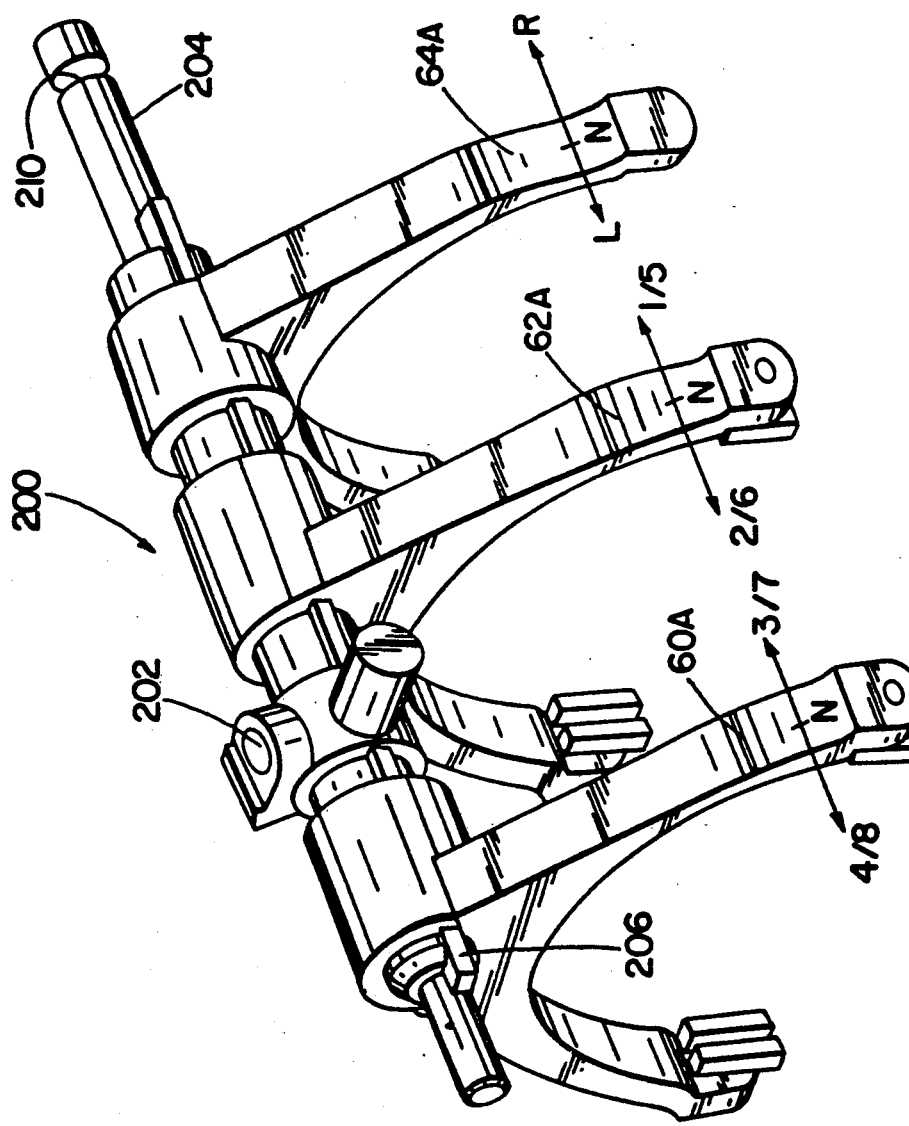
FIG. 4 is a prospective view of a single shift shaft type shifting mechanism.

In the preferred embodiment of the present invention, a single shift shaft type shifting mechanism 200 of the type illustrated in FIG. 4 is utilized. Mechanisms of this type are known in the prior art as may be seen by reference to U.S. Pat. Nos. 4,920,815 and 4,621,537, the disclosures of which are incorporated herein by reference.

Briefly, shift lever 98 will interact with block member 202 to cause rotational or axial movement of shaft 204 relative to the transmission housing. Rotational movement will cause keys, such as key 206 and another unseen key, to interact with lands or slots provided in the hubs of the shift forks 60A, 62A and 64A to axially fix two of the shift forks relative to the housing and to axially fix the other shift fork to shaft 204. Axial movement of the shaft 204 and the selected shift fork axially fixed thereto will then result in engagement and disengagement of the jaw clutches associated therewith.

Accordingly, by monitoring of the axial position of a selected segment of shift shaft 204, such as one or more neutral detent notches 210, the in neutral-not in neutral condition of the main section 12 of transmission 10 may be sensed.

The present invention is also applicable to compound transmissions utilizing the well known multiple parallel rail type shift bar housing assemblies as may be seen by reference to U.S. Pat. Nos. 4,445,393; 4,275,612; 4,584,895 and 4,722,237, the disclosures of which are hereby incorporated by reference. Such devices typically include an assembly extending perpendicular to the shift rails (often associated with a shift rail interlock mechanism) which will assume a first position when all of the shift rails are in an axially centered neutral position or a second position when any one of the shift rails is displaced from the axially centered neutral position thereof.

The present invention is also applicable to compound transmissions wherein other mechanical, electrical, electromagnetic or other types of sensors are utilized to sense conditions indicative of transmission main section neutral (not engaged) or not neutral (engaged) conditions.

Although the auxiliary transmission sections are typically attached to the main transmission section, the term "auxiliary transmission section" as used herein is also applicable to detached drive train devices such as multiple-speed axles, multiple-speed transfer cases and the like.

While the present invention is equally applicable to transmission 10 illustrated in FIG. 1 and transmission 100 illustrated in FIGS. 2 and 3, as well as other compound transmissions utilizing synchronized auxiliary section jaw clutch assemblies, for purposes of simplification and ease of understanding, the present invention will be described primarily as utilized with the compound range type transmission illustrated in FIGS. 1, 1A, 1B and 1C.

Assuming a shift control of the type illustrated in FIG. 1B, i.e. a "repeat H" type control, a 4th-to-5th speed compound shift involves disengaging jaw clutch 60 from 4th/8th speed input gear 24, then disengaging clutch 92 from range low speed or reduction gear 86 and engaging clutch 92 with the high speed or direct range gear 88 and then engaging jaw clutch 62 with 1st/5th speed main section gear 54. To accomplish this, the vehicle operator will preselect "HI" with the range selector button 98, will shift from the 4/8 position to N and then to the 1/5 position with shift lever 72. In prior art range type transmissions, such as the 9-speed RT/RTO 11609 "Roadranger" transmission manufactured and sold by Eaton Corporation, a two-position slave valve having a first position for causing "HI" range to be selected and a second position for causing "LO" range to be selected was interlocked in one of its two positions by a plunger or the like wherever the main transmission section 10 was not in neutral. Examples of such valves and interlocks may be seen by reference to above-mentioned U.S. Pat. Nos. 3,229,551; 4,450,869; 4,793,378 and 4,974,474.

As indicated previously, while these devices will, under most conditions, protect the range section synchronizers by preventing initiation of a range shift until the main section is shifted into neutral, under certain conditions the main section shift may complete prior to the range shift which will place the range synchronizer at risk. This is a considerably greater problem for range upshifts (4th-to-5th) than for range downshifts (5th-to-4th) as torque across the synchronizer friction cone surfaces (174/178 in FIG. 3A) when engaging direct range gear 88 will tend to increase the tendency of the synchronizer being hung up on the synchronizer blockers while torque across the friction cone surfaces (176/180 in FIG. 3B) when engaging reduction range gear 86 will tend to pull the synchronizer to an unblocked condition. Generally, in transmissions of the type illustrated in FIGS. 1 and 2, range section synchronizer burn-out is not seen as a significant problem in range section downshifts.

Referring to the transmission of FIG. 1, another serious problem may occur when a driver in 4th gear decides to upshift, then preselects a range upshift and then moves the shift lever to or towards the neutral position. If the driver quickly changes his mind and moves the shift lever back to the 4/8 position without changing the range selection, the range clutch may attempt to complete a range only 4-8 upshift and the large speed differential across the synchronizer cone friction surfaces may result in rapid damage thereto. In such situations, a synchronizer may be severely damaged or destroyed with two seconds.

Similar inadvertent attempted compound skip upshifts will have similar results. For another example, if a driver inadvertently preselects or forgets a preselection of a range upshift, and then attempts a 4-3 downshift, the actual result will be an attempted 4-7 upshift with a large speed differential across the synchronizer friction surfaces.

The auxiliary section control system/method of the present invention overcomes the prior art drawbacks by reducing the force applied by shift fork 94 to engage high speed range gear 86 to a relatively low level when a main section not neutral condition is sensed. The relatively low force is selected to be sufficient to cause the synchronized clutch to engage when synchronous conditions occur but low enough to assure that the risk of synchronizer burn out is minimized or eliminated.

While the present invention is particularly well suited for use in controlling the engagement of a synchronized range clutch, especially the high speed or direct range clutch of a compound transmission, it is not intended to be limited to such use and could be useful in controlling the engagement of synchronized splitter clutches or the like.

For purposes of simplification, the present invention will be described in connection with its expected most advantageous use, namely controlling the force applied to engage the direct or high speed synchronized range clutch (clutch teeth 166 and 170 in FIG. 3A) of a range (10), range/splitter or splitter/range (100) type of compound transmission.

While the typical force applied to engage a range clutch is a function of the effective fluid pressure (usually pneumatic) applied to an effective piston area, engagement force may also be applied by electromechanical means such as electric motor driven ball screws or the like, electromagnetic means such as solenoid type devices, or other force application means. With fluid pressure application systems, the application force applied to a range clutch is variable by varying the effective fluid pressure and/or effective piston area. With electromagnetic and electromechanical systems, force may be varied by varying the electric current, voltage or the like.

While not intending to so limit the present invention, the present invention will be described in its preferred mode of a pneumatic actuation system.

In the prior art range clutch actuators, assuming a range shift has been selected/preselected, the main transmission section has been shifted into neutral and the range valve interlock is released, the range valve will provide the selected chamber of the range clutch actuation cylinder/piston with a pressure (usually regulated to about 60 psi-to-80 psi) sufficient to apply a force of about (300 to 400 lbs.) to quickly move the selected clutch into engagement and/or into the blocked position and to apply a significant synchronizing force through the synchronizer friction cones to cause rapid synchronous rotation of the clutch members, unblocking of the synchronizer and movement of the clutch members through the blocker and into positive engagement. If the main section remains in neutral, or in the event of a range section shift into the range low-speed or reduction ratio, the force will not result in damage to the synchronizer and will result in a relatively quick range section engagement. However, in the event the main section is engaged prior to completion of an attempted range section upshift into the range section high speed or direct ratio, serious damage to and/or destruction of the synchronizer may occur relatively quickly, in the event of an attempted skip upshift usually within about two (2.0) seconds.

It has been discovered that, upon sensing conditions indicative of a main section shift into engagement (i.e. not neutral) prior to completion of an attempted range section shift into the range section high speed or direct ratio, if the force applied to engage the direct range clutch is reduced to a relatively lower second level (about 40 to 80 lbs.) the direct ratio synchronized range clutch will still engage upon a substantially synchronous rotation of the clutch members (sleeve 162 and gear 114 in FIG. 3A) while the synchronizers will not, at least within a predetermined time (such as 20 to 45 seconds), be damaged or destroyed.

The second lower force is not acceptable for normal engagement of the range synchronizer clutches as a sufficient force is not applied to the synchronizer friction clutches and many range shifts would take an objectionably long period of time.

While a variable pressure pressure-regulator may be used to achieve a second force level for applying the direct range clutch, in the preferred embodiments a differential area piston method is utilized. As may be seen by reference to FIGS. 5, 6 and 7, the range clutch actuator piston assembly 220 defines a differential area piston 221 having a first surface area 222 (about 3.96 sq. inches) pressurized to engage the low range clutch, and a second larger surface area 224 (about 4.65 sq. inches) pressurized to engage to high range clutch with the first level of force (p*a$_{224}$) Pressurizing both the surface areas will result in regulated pressure (80 psi) applied to the differential area (the second surface area 224 minus the first surface area 222) and is effective to apply the direct clutch with a relatively low second level of force (p*(a$_{224}$−a$_{222}$) equaling about 54 lbs).

Piston 221 is sealingly and slidably received in a cylinder divided into two chambers 222A and 224A. Piston 221 includes a shaft 226 to which is mounted shift yoke 164 for shifting synchronized clutch 128 or 92 to the selected positions thereof.

To provide the synchronizer protection effect, while still urging the direct range clutch into engagement, the present invention is effective to (i) pressurize only the second surface area 224 when a range shift into direct is selected and the main section is in neutral and (ii) to pressurize both the first and the second surface areas (222 and 224) when a range section shift into direct is selected and the main section is engaged in a ratio (i.e. not neutral).

The second force level must be sufficient to cause a direct range clutch engagement when synchronous or substantial synchronous rotation of the high speed range clutch members is achieved and preferably should be sufficient to maintain the direct range in engagement (or in-gear detent means should be provided). The second force should be sufficiently low so that when the synchronizer is engaged on the block, with the main transmission section engaged, the synchronizer cone clutches or the like will not suffer substantial damage for a predetermined period of time, such as, for example, twenty (20) to forty-five (45) seconds.

As an example, a first force of about 300 to 400 lbs. with a second force of about 40 to 80 lbs. has proven highly satisfactory.

Figure 5:
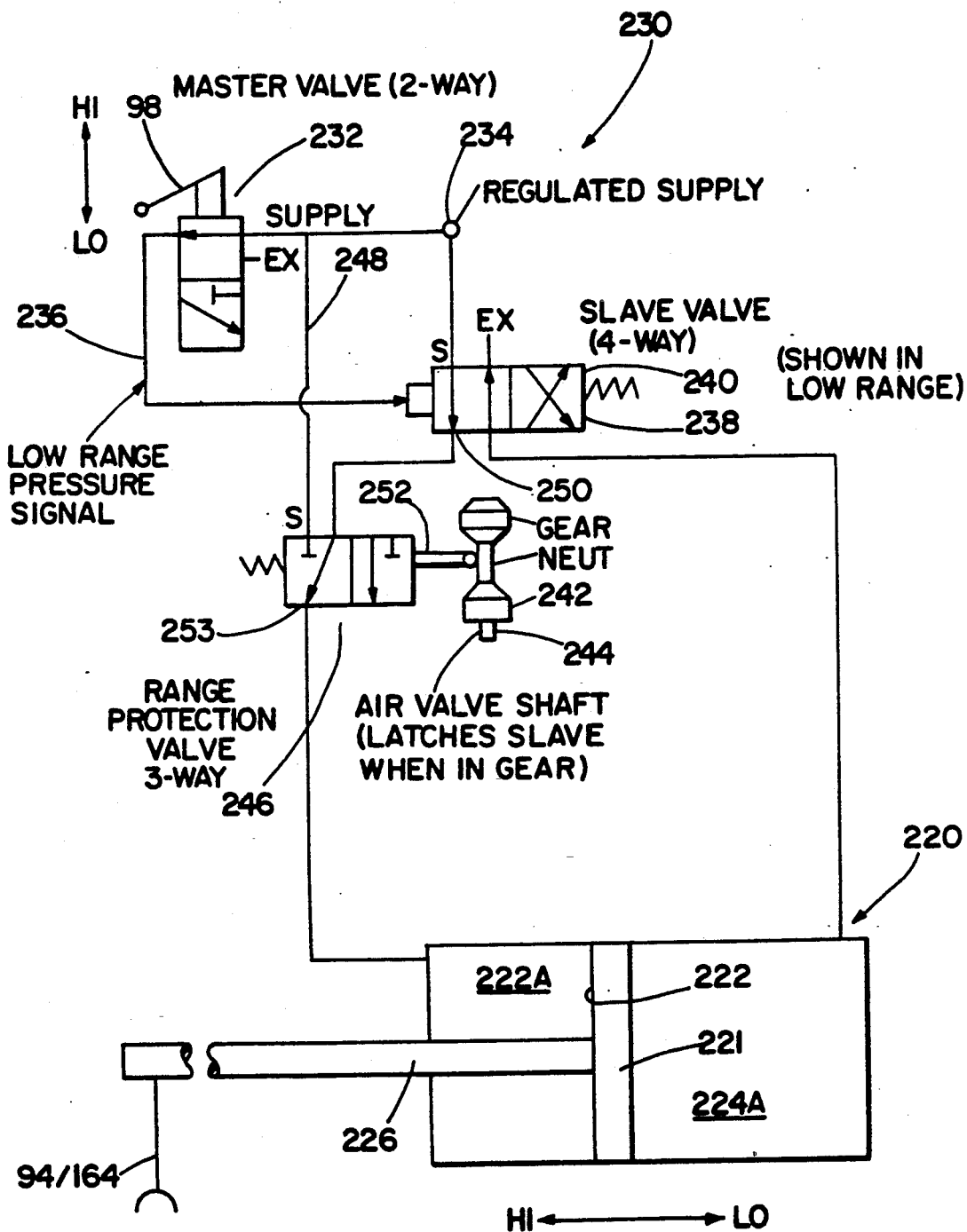
FIG. 5 is a schematic illustration of an air control system for implementing the present invention.
Figure 6:
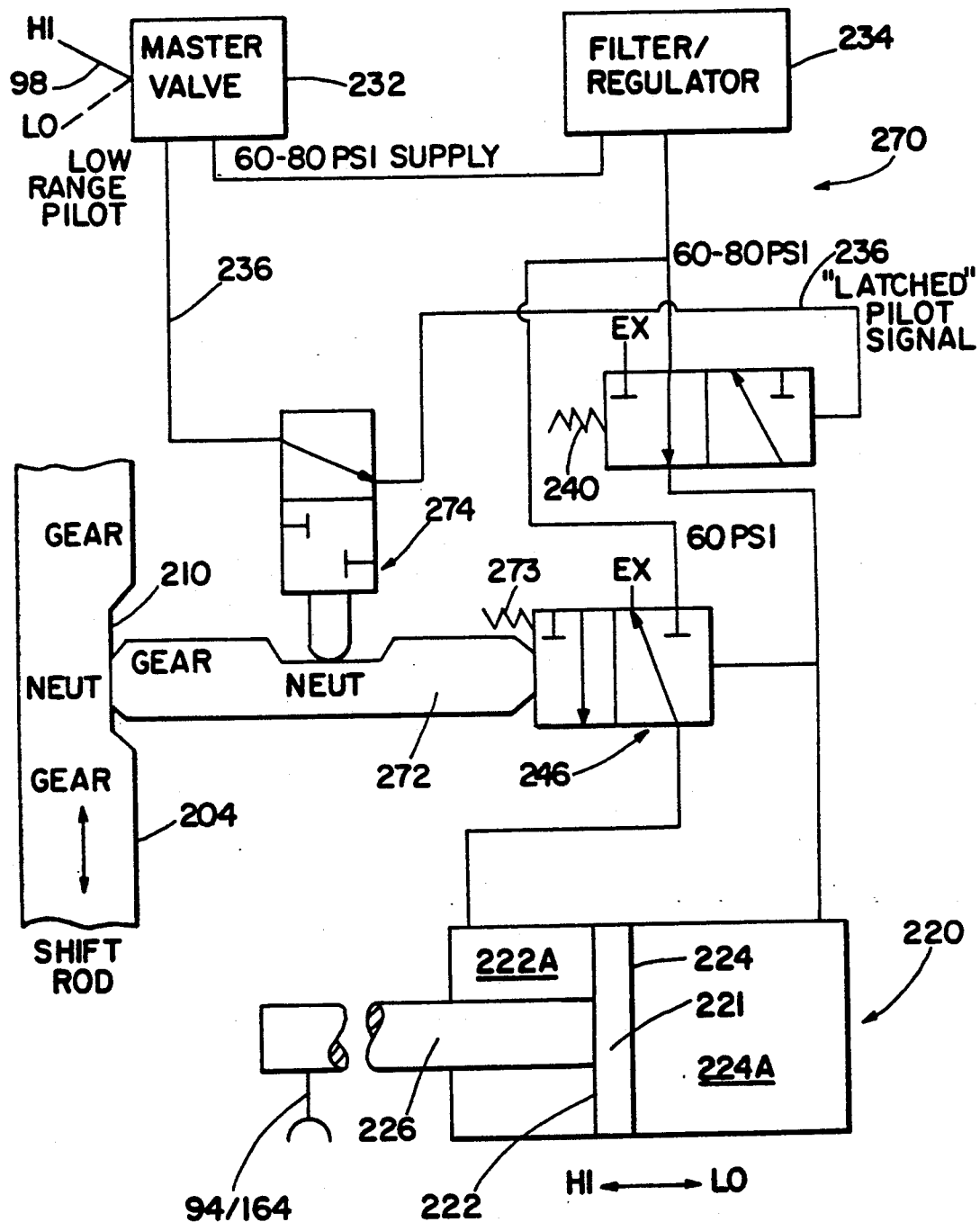
FIG. 6 is a schematic illustration of an alternative air control system.
Figure 7:
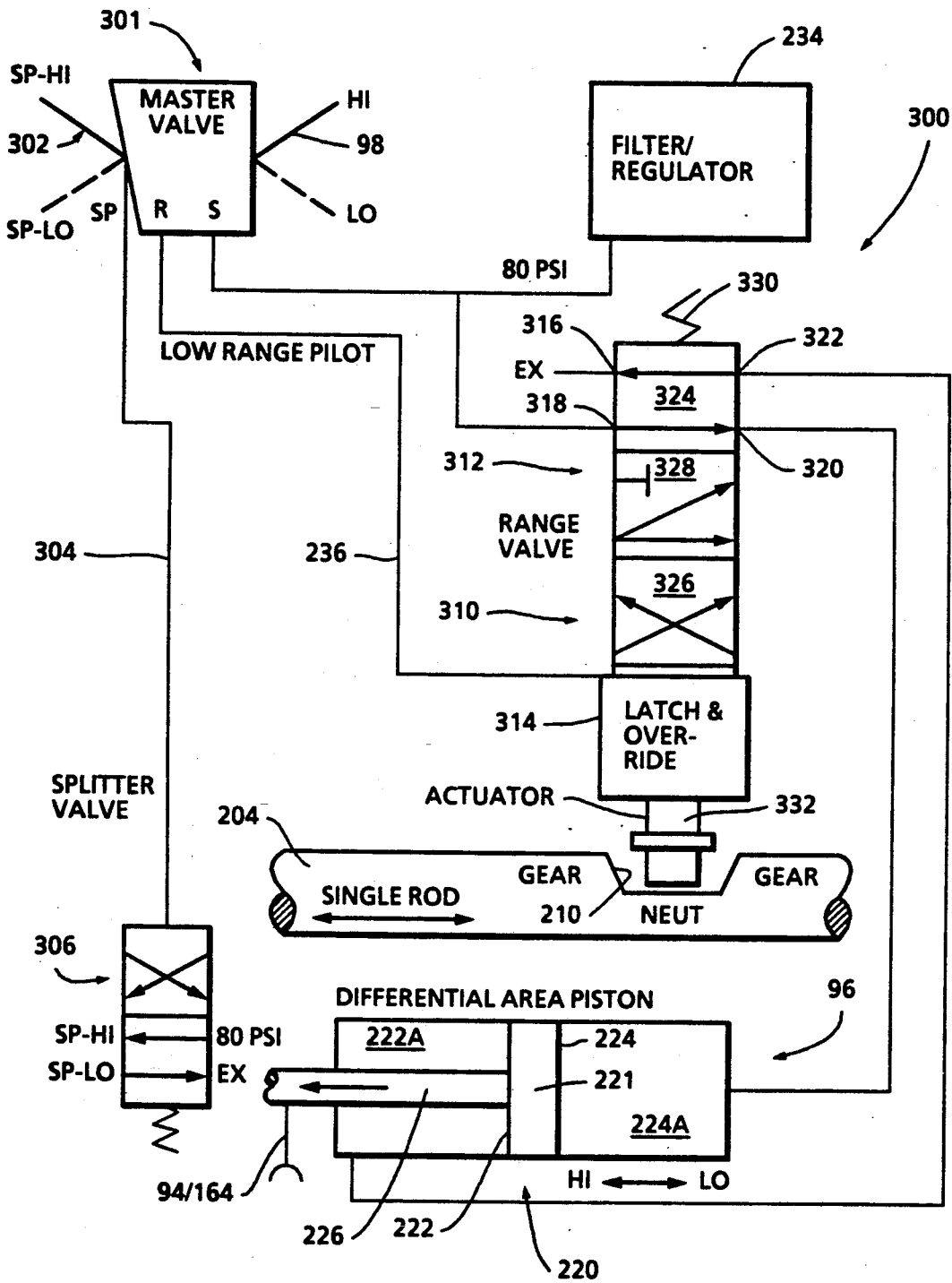
FIG. 7 is a schematic illustration of a preferred air control system utilizing the valve assembly of the present invention.
Figure 8:
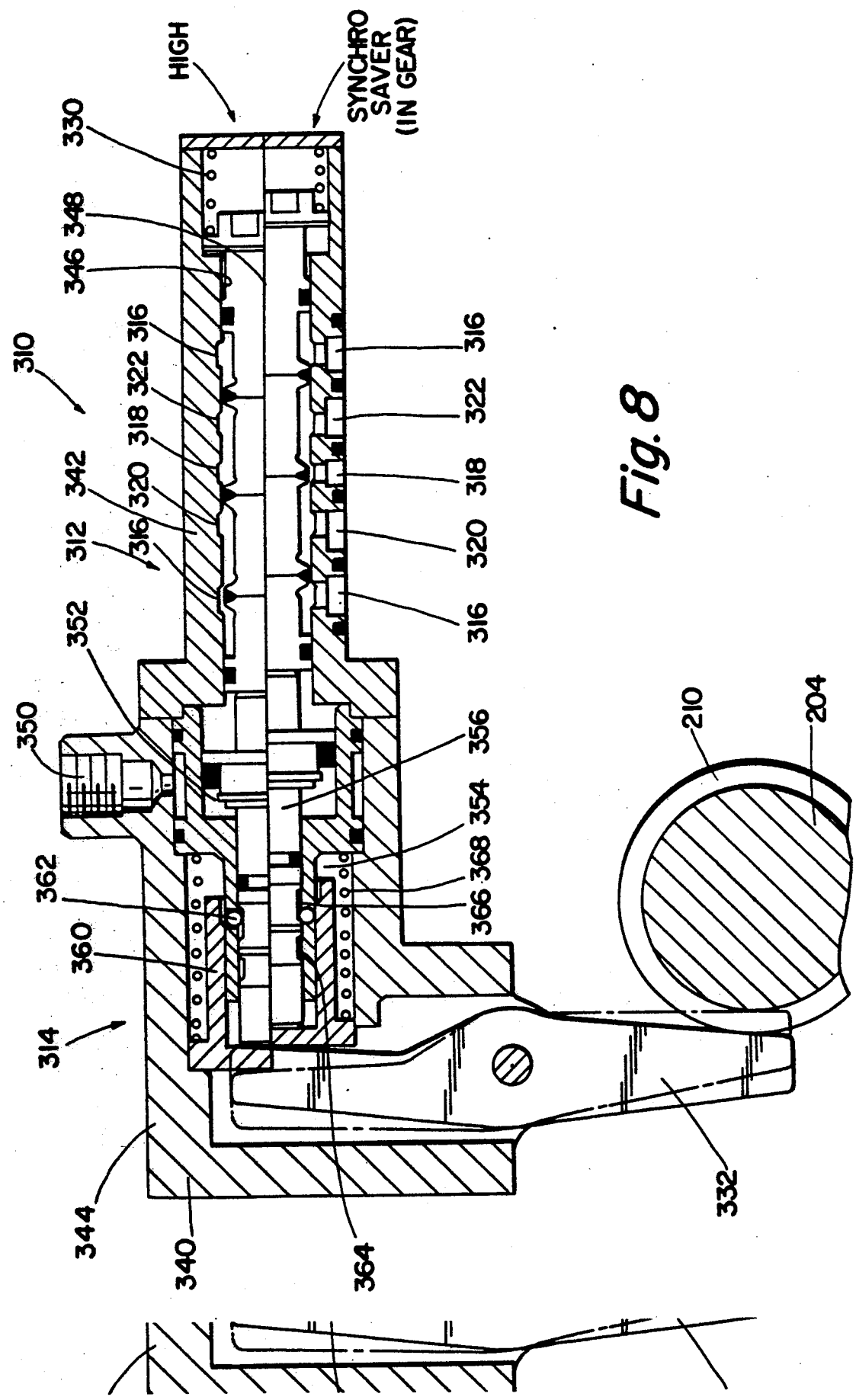
FIG. 8 is a sectional view of the valve assembly for the air control system illustrated in FIG. 7.
Figure 9:
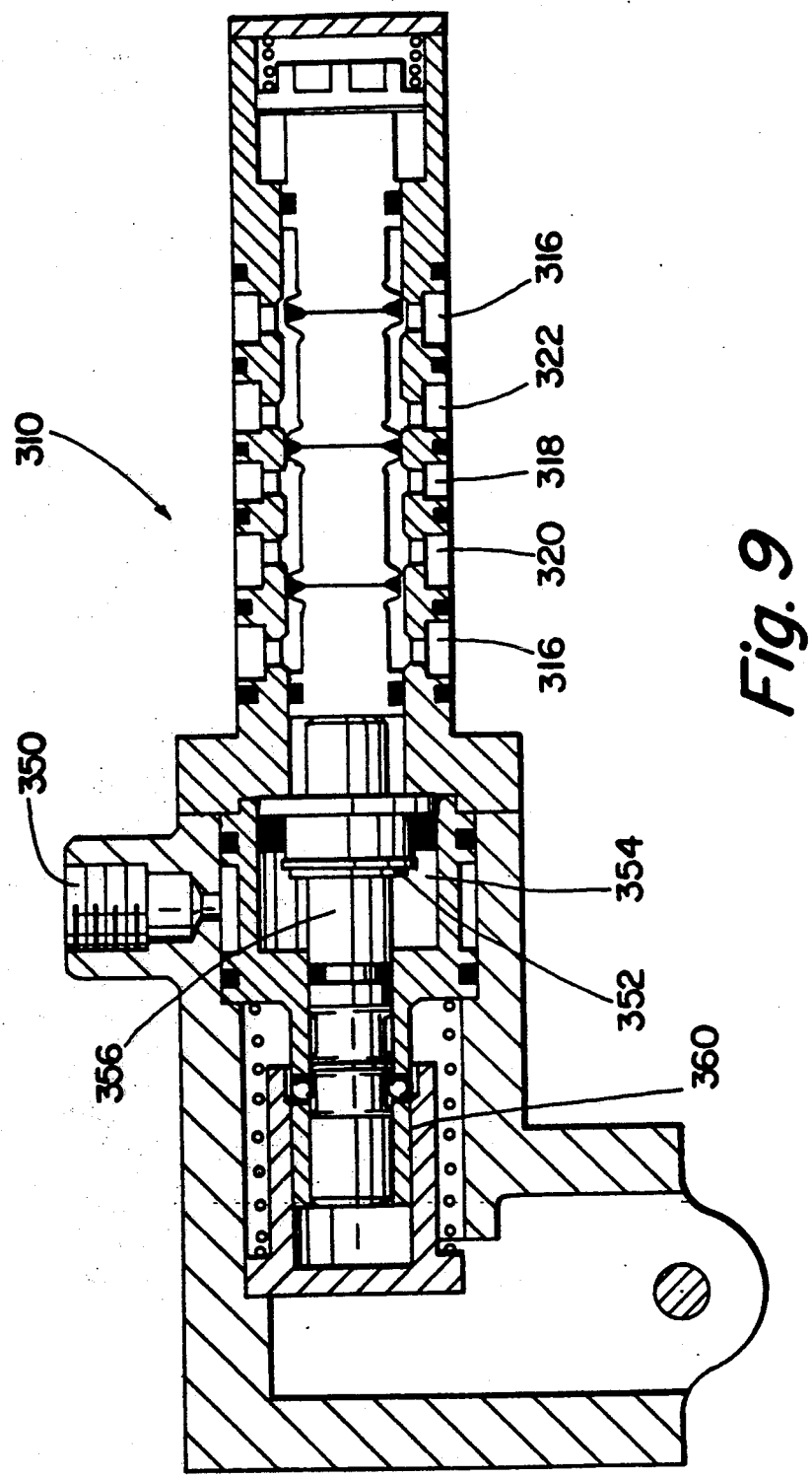
FIG. 9 is a section view of the valve assembly of FIG. 8 in a different operational position thereof.
Figure 10:
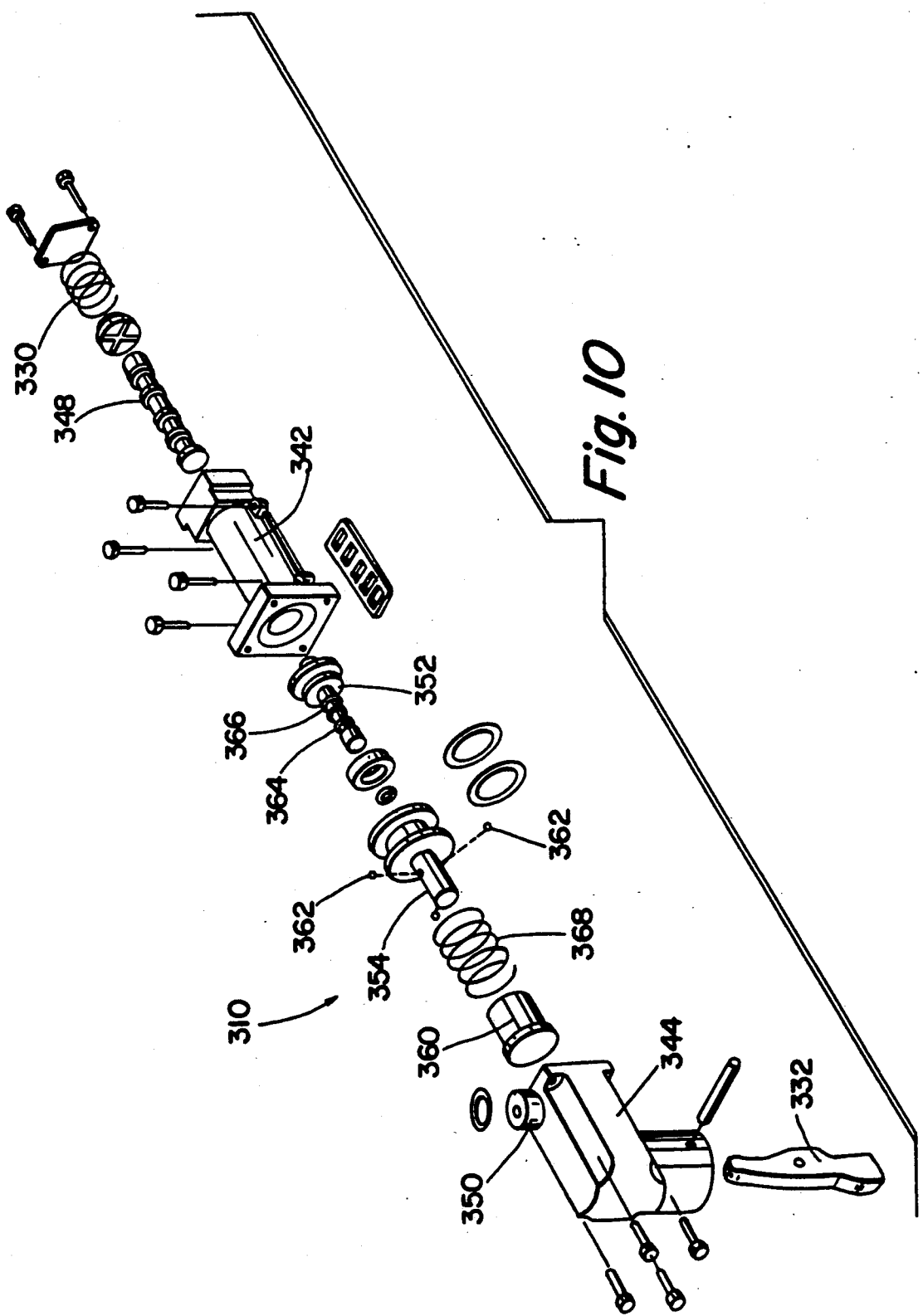
FIG. 10 is an exploded view of the valve assembly of FIG. 8.

Schematics of air systems to achieve the above effect may be seen by reference to FIGS. 5, 6 and 7 while a valve assembly particularly well suited to achieve the above may be seen by reference to FIGS. 8, 9 and 10.

As indicated previously, the not engaged (neutral) and the engaged (not neutral) conditions of the main section (12) of transmission (10) may be sensed by sensing axially nondisplaced or displaced positions of the main transmission section shift shaft(s) 204. Such axial displacement of a shift shaft or shift rail may be sensed on the shaft or rail per se, on an extension thereof, or on a cross-shaft or the like.

Devices for applying either a first or a second relatively lesser force to shifting forks, such as engaging with a larger first and disengaging with a second smaller force, are known in the prior art as may be seen by reference to U.S. Pat. No. 4,928,544, the disclosure of which is hereby incorporated by reference.

A synchronizer protecting range shift air control system 230 is illustrated in FIG. 5. The master range valve 232 is connected to a source of filtered and regulated air from filter regulator 234. In heavy-duty vehicles, the regulated air pressure is usually 60 to 80 psi. Switch or lever 98 is effective to either pressurize (Low) or vent (High) the low pressure signal or pilot line 236. The low range pilot line 236 connects to the range slave valve 238 which is a two-position, four-way valve spring 240 biased to the high range position (i.e. chamber 224A pressurized and chamber 222A exhausted) and responsive to pressurization of pilot line 236 to move to the low range position (i.e. chamber 222A pressurized and chamber 224A exhausted).

A shaft 242 movable to either an in-gear position or a neutral position is provided with an interlock plunger 244 for preventing initial movement of slave valve 238 until the main section is shifted into a neutral position. All of the above-described components of control system 230 are considered to be relatively standard in prior art range type transmissions.

To the above components is added a two-position, three-way range protection valve 246. Range protection valve 246 is constantly connected via line 248 to source pressure and to the outlet port 250 of the slave valve associated with the low range chamber 222A.

Range protection valve 246 includes a plunger 252 for sensing the in-gear or neutral conditions of the main section. The outlet port 253 of valve 246 connects to low range chamber 222A of the range actuator piston assembly 220.

When the main section is in neutral, as shown in FIG. 5, the outlet port 250 of the slave valve 238 is connected directly through the range protection valve 246 to chamber 222A. When the main section is engaged, the range protection valve 246 connects low range chamber 222A to source, regardless of the position of the slave valve 238.

Accordingly, if at any time after initiation of a range shift the main transmission section is shifted into an engaged (not neutral) condition, then the low range chamber 222A will be pressurized, regardless of the position of the slave valve 238. This will allow normal completion of a shift into range low or a shift into range high at a considerably reduced second force.

A similar control system 270 is illustrated in FIG. 6. System 270 differs from system 230 described above primarily in that a shaft 272, which interacts with groove 210 in single shift shaft 204, provides a mechanical actuation for the range protection valve 246 and also actuates an air rather than a mechanical interlock mechanism, interlock valve 274. Briefly, two-position, two-way interlock valve 274 will prevent pressurizing or exhausting of low pilot line 236 at the slave valve 238 until the transmission main section is shifted into neutral.

As in system 230, range protection valve 246 will pressurize the low range chamber 222A when the main transmission section is engaged (not neutral) regardless of the positions of the other valve members. Thus, when low is selected, and the main section is shifted to neutral, the high range chambers 224A of the piston assembly 220 is exhausted and then, when a shift into main section engaged occurs, the low pressure chamber 222A will be pressurized to complete the range downshift.

Valve 246 is biased rightwardly by spring 273 which is insufficient to resist the leftward bias of a pressurized line to chamber 224A.

Components of systems 230, 270 and 300 (to be described below) having substantially identical structure and function have been assigned like reference numerals.

The air control system 300 is schematically illustrated in FIG. 7. The control system 300 includes a master valve 301 similar to master valve 232 described above and having a selector switch 98 for selecting high (HI) or low (LO) range ratio. The master valve 301 may also include a second selector switch 302 for selecting either splitter high or splitter low splitter ratio. A splitter low pilot line 304 controls the operation of a two-position three-way splitter slave valve 306. Master valves such as 301 are associated with compound transmissions of the combined range and splitter type as illustrated in FIGS. 2 and 3.

The range slave valve assembly 310 includes a three-position, four-way valve 312 and a latch and override mechanism 314. Valve 312 has port 316 connected to exhaust, a port 318 connected to source air from the filter/regulator 234 (80 psi), a port 320 connected to the high range cylinder 224A of the differential area piston assembly 220, and a port 322 connected to the low range cylinder 222A of the differential area piston assembly 220.

Valve 312 has a first 324 position (upper position in FIG. 7), for selecting high range, wherein the high range cylinder 224A is connected to source pressure and the low range cylinder 222A is vented to exhaust. Valve 312 has a second 326 position (lower position in FIG. 7), for selecting low range, wherein the low range cylinder 222A is connected to source pressure and the high range cylinder 224A is vented to exhaust. Valve 312 has an intermediate or third 328 position wherein both the high (224A) and the low (222A) range cylinders are connected to the source pressure.

The valve 312 is spring 330 biased into the first (324) or high speed range position and may be moved to its second (326) or low speed range position by action of low range pilot pressure from line 236. By mechanical means of an override actuator lever or link 332 interacting with the notches 210 and adjacent lands on shift shaft 204, the valve is movable from the first (324) position to the intermediate third (328) position thereof if the main transmission is shifted to an engaged position while the valve is in the first position thereof.

The latch function of the latch and override assembly 314 is to prevent the valve from moving from the first 324 to the second 326, or from the second 326 to the first 324, positions thereof when the main section is in neutral but not to prevent movement of the valve from the first 324 to the intermediate 328 third positions thereof. The latch and override assembly thus provides the range interlock function of preventing initiation of a range shift until the main section is shifted into neutral. A specific structure for the valve 312 and the latch and actuator assemblies 314 is illustrated in FIGS. 8, 9 and 10 and described in greater detail below.

As an alternative design, see FIG. 9, the low range pilot line 236 may be omitted and a modified or additional actuator lever and shift shaft 204 utilized to mechanically shift the valve 312 against the bias of spring 330 into the second 326 low range position thereof in response to shifting into the low range portion of a "double H" type shift pattern. The alternative design is discussed below and more fully illustrated in FIGS. 11, 12A and 12B.

In operation, for a shift from high to low range ratio, the selector 98 will be moved to select/preselect the "LO" position and pilot line 236 will be pressurized. As soon as the shift shaft position indicates the main section is in neutral, the latch 314 will release allowing the valve mechanism 312 to assume the second position 326 thereof which will cause pressurizing of low range chamber 222A and exhaust of high range chamber 224A. The override does not effect the valve in the second position 326 thereof, and thus the positioning of valve 312 will remain as is until selector 98 is moved.

To shift from low to high range ratio, the selector 98 will be moved to select/preselect the "HI" position and the pilot line 236 will be exhausted. As soon as the shift shaft position indicates a main transmission neutral condition, the latch is released and the valve 312 will move to the first 324 position thereof under the bias of spring 330. High range chamber 224A will be pressurized and low range chamber 222A will be exhausted. Thereafter, as the transmission main section is engaged, the actuator link 332 will move the valve 312 from the first position (324) to the third or intermediate position (328) wherein both the high range ratio (224A) and low range ratio (222A) cylinder chambers are pressurized to provide a reduced force on the shift fork, 94 or 164, urging the high speed range synchronized clutch into engagement.

The structure of the range slave valve assembly is illustrated in FIGS. 8, 9 and 10. Range slave valve assembly 310 is contained within a two-piece housing 340 defining a spool housing portion 342 and a latch and override mechanism portion 344. Valve spool portion 342 defines an internal bore 346 in which is received a valve spool 348 and also defines ports 316 (two), 318, 320 and 322 connected to exhaust, supply, the low range piston chamber 222A and the high range piston chambers 224A, respectively. A port 350 for connection to the low speed pilot line 236 is defined in the latch and override portion. The leftward end of valve spool is provided with a piston surface 352 sealingly and slidably received in a chamber 354 communicating with port 350. Biasing spring 330 is seated at the rightward end of bore 346 and engages the end of valve spool 348 to urge the valve spool leftwardly.

The first position 324 of valve 312 corresponds to the most leftwardly position of valve spool 348 as seen in the upper half of FIG. 8. In this position, ports 318 and 322 are in fluid communication, ports 320 and the left port 316 are in fluid communication, and the right port 316 is sealed from the other ports.

Figure 12A:
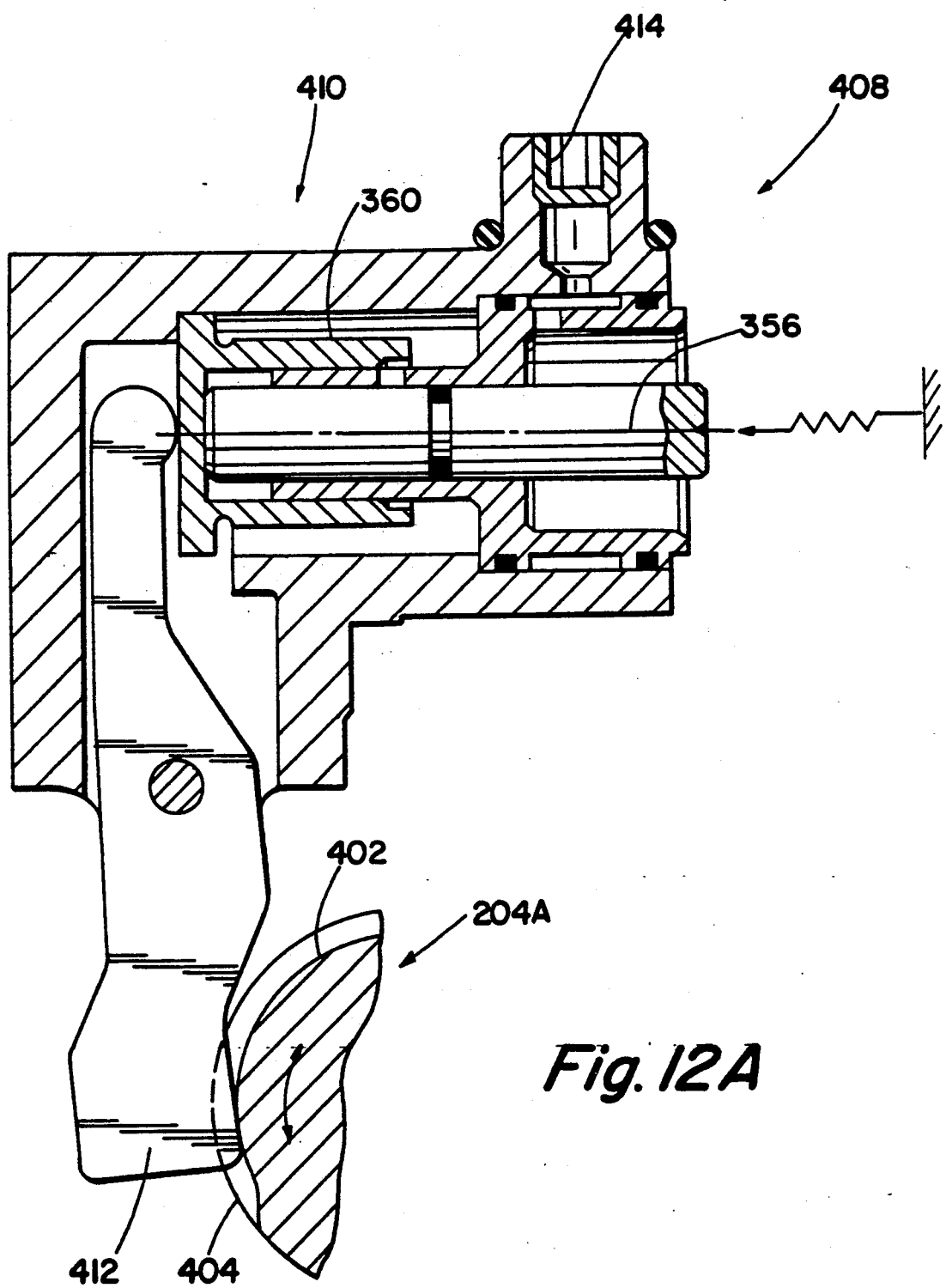
FIGS. 12A-12B are partial sectional views of the alternate valve assembly configuration for the air control system of FIG. 11.
Figure 12B:
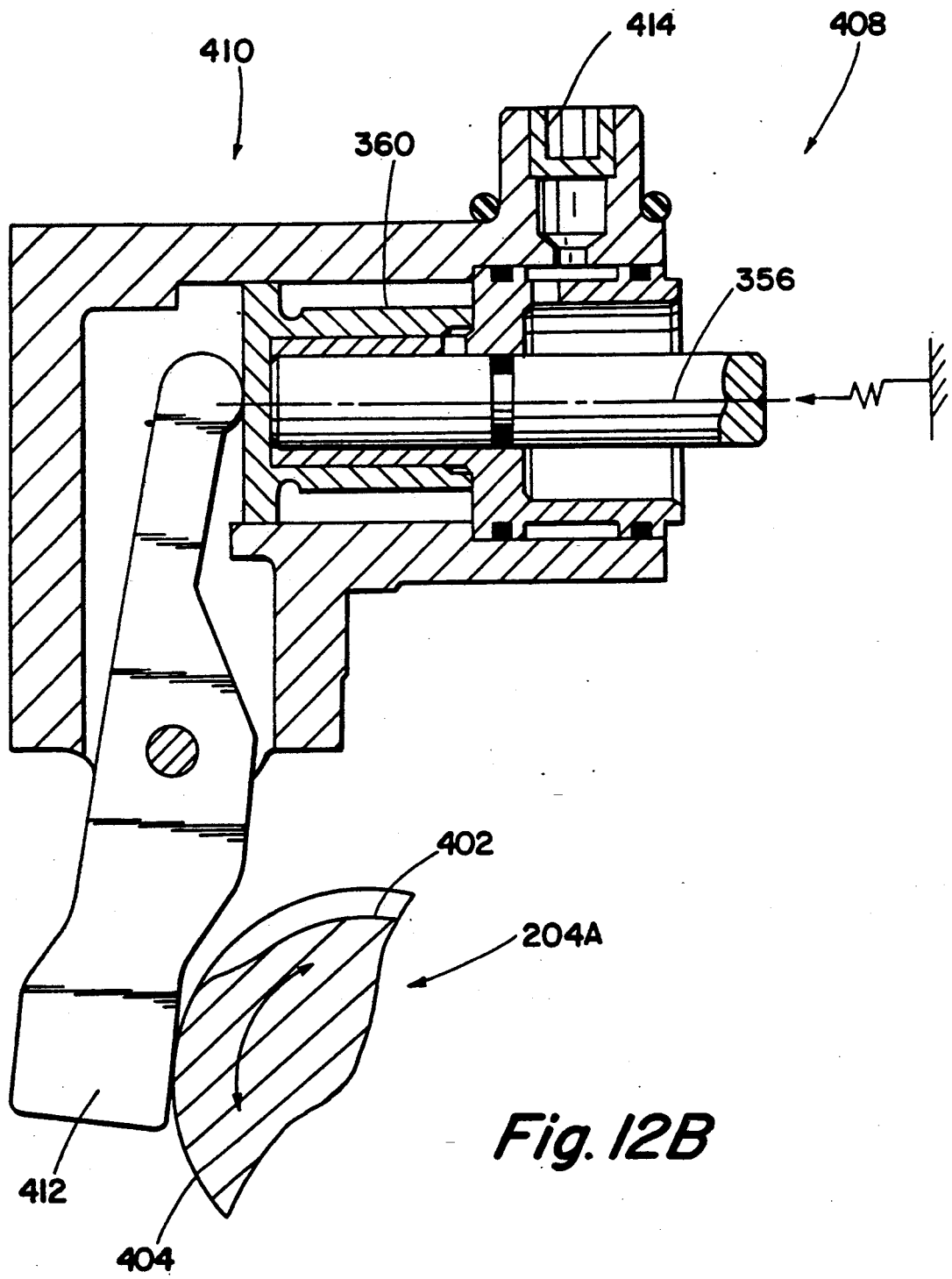

The second position 326 of valve 312 corresponds to the rightwardly position of valve spool 348 as illustrated in FIG. 9. In this position, ports 318 and 320 are in fluid communication, ports 322 and righthand port 316 are in fluid communication and the left hand port 316 is sealed from the other ports. As illustrated in the left upper and lower portions of FIG. 9, spool 348 may be urged to the rightward or second position either by pressurizing the chamber 352 through port 350 and low range pilot line 236 (FIG. 9) or by means of a lever or link 355 similar to lever 332 but acting on large diameter surface of a shaft utilized in a double H shift pattern and push rod portion 356 of spool 348 (FIGS. 12A and 12B).

The third or intermediate position 328 of valve 312 is illustrated in the lower portion of FIG. 8. In this Position, both ports 320 and 322 fluidly communicate with source port 318 and both exhaust ports are sealed from the other ports. As may be seen by reference to FIG. 8, when lever actuator 332 rides on the outer surface of shaft 204, the lever will engage a portion of push rod 356 to urge the spool to the intermediate position thereof. It is noted, that when the spool is in the rightward most position, i.e., the second position 326 of valve 312, the override lever 332 (see FIG. 8) will not effect the position of the spool.

The latch function of the latch and override assembly 314, is providing the range interlock function of preventing initiation of a range shift until the main transmission section is shifted into neutral, and is accomplished by collet 360, detent roller 362 and grooves 364 and 366 in the push rod extension 356 of the valve spool. Detents 362 are received in slots in housing portion 344 for radial movement and the outer surface of push rod extension 356 includes a first detent groove 364 which will align with the detent rollers when the spool is in the second position thereof (FIG. 9) and a second detent groove 366 which is elongated and will align with the detents when the spool is in either the first position or in the second position or is in transit therebetween. When the collet 360 is in the retracted position under the bias of spring 368, see the top of FIG. 8 and FIG. 9, the detents balls or rollers 362 are movable radially outwardly and will not effect the axial movement of the valve spool 348. However, when the collet is pushed rightwardly by the lever 332, see the bottom of FIG. 8, the detent rollers 362 are locked against axially outward movement and the spool 348 is interlocked in either the first to the intermediate (third) axial position or in the second axial position thereof.

An "exploded" view of the range valve assembly 310 may be seen by reference to FIG. 10. For purposes of clarity, the various seals, gaskets and the like are not identified by reference numerals.

Figure 11:
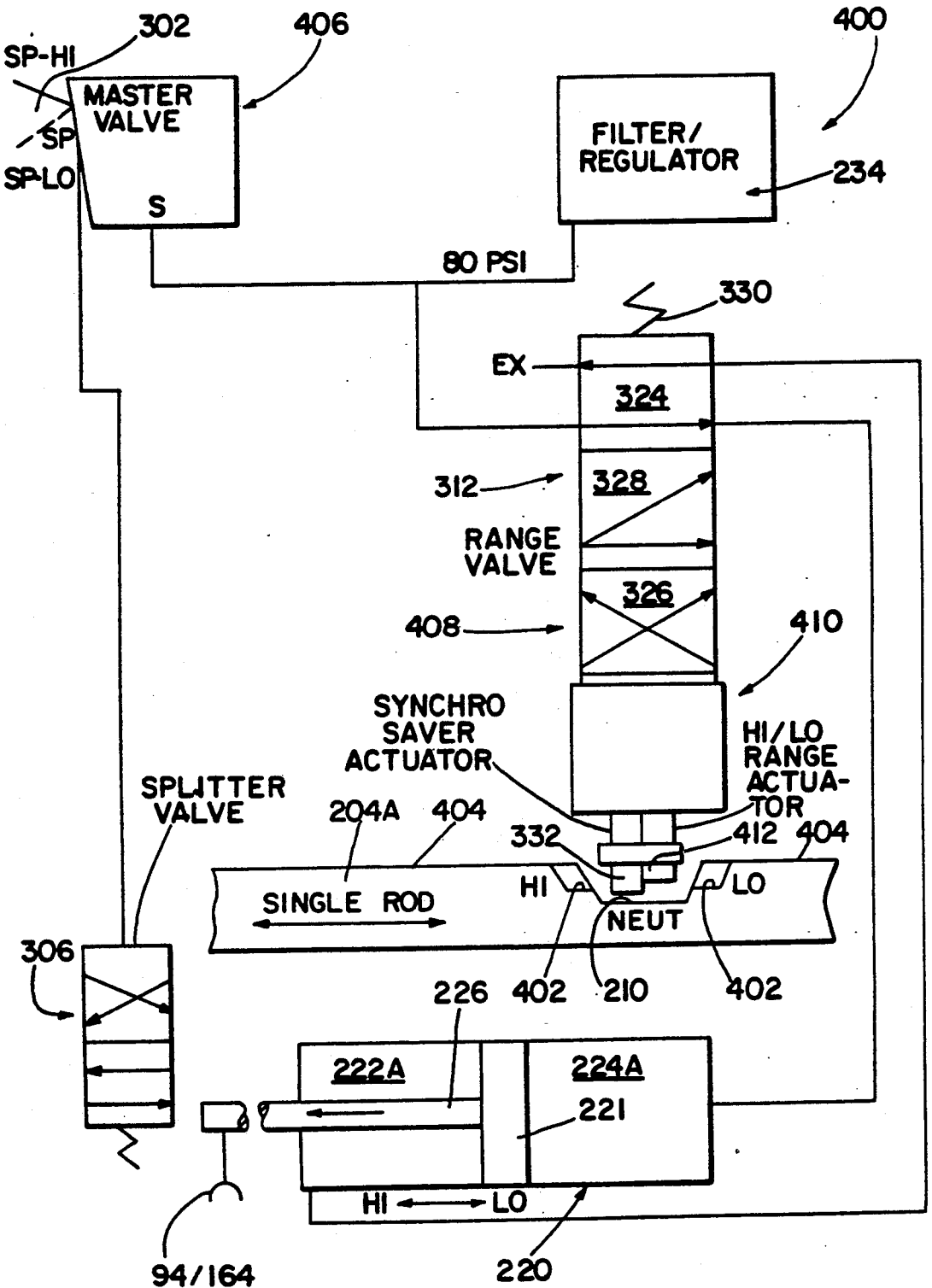
FIG. 11 is a schematic illustration of an alternate configuration of the air control system illustrated in FIG. 7.

An alternate configuration of the air control system 300 and range valve assembly 310 illustrated in FIGS. 7-10 may be seen by reference to FIGS. 11, 12A and 12B.

FIGS. 11, 12A and 12B illustrate an air control system 400 for use with a "double H" shift mechanism wherein switch 98A is not utilized but a shift shaft 204A, is provided with relatively smaller diameter portions 402 and relatively larger diameter portions 404, respectively, corresponding to operation in the high range or low range portion, respectively, of the "double H" pattern. Master valve 406 differs from the master valve 301 in that only a splitter selector switch or button 302 is provided.

The valving portion 312 of valve assembly 408 is identical with the valving portion 312 of valve assembly 310. The actuator portion 410 of valve assembly 408 differs considerably from the latch and override portion 314 of valve assembly 310.

In addition to the link member 332 which cooperates with neutral notch 210 to move the valving portion 312 from the first 324 to the second position 328 thereof upon sensing a main section engaged condition, a second, independent, link or lever 412 is provided. Lever 412 is the high/low range actuator and cooperates with raised surfaces 404 on shift shaft 204A to move valve portion 312 to the second position 326 thereof as shift shaft 204A is rotated into the high range portion of the "double H" pattern.

As may be seen by reference to FIGS. 12A and 12B, lever 412 replaces the piston assembly 352/354 utilized in valve assembly 310 and thus the low range Pilot port 350 is sealed with a plug 414.

FIG. 12A shows valve assembly 410 in the high speed range position and FIG. 12B illustrates valve assembly 410 is the low speed range position thereof. While collette 360 is utilized, the detent rollers are not needed as the latch function is unnecessary due to the fact that elimination of a range selector switch also eliminates the possibility of preselection of a range shift.

While the present invention has been described with a certain degree of particularity, it is understood that the present description is by way of example only and that modification and rearrangement of the parts is possible within the spirit and the scope of the present invention as hereinafter claimed.

We claim:

1. A valve assembly (310) for use in a control system (300.400) for controlling a pressurized fluid operated shift actuator (220) for an auxiliary transmission section (14) of a compound transmission (10) including a main transmission section (12) having engaged and not-engaged positions connected in series with said auxiliary transmission section, said auxiliary transmission section including a selectable high speed ratio (direct) and a selectable low speed ratio (reduction), each of said ratios engageable by a synchronized jaw clutch assembly (92/128), said actuator (220) comprising a differential area piston (221) having a first piston surface (224) defining a first chamber (224A) and a second piston surface (222) defining a second chamber (222A), said first piston surface area being larger than an area (a222) defined by said second piston surface, pressurization of said first chamber (224A) causing said actuator to urge said synchronized clutch assembly to engage said high-speed ratio and pressurization of said second chamber (222A) causing said actuator to urge said synchronized clutch assembly to engage said low-speed ratio said system including means (204, 210) for indicating the current engaged or not engaged condition of said main transmission section, selector means (98/98A/412) for selecting a desired auxiliary section ratio, a common source (234) of pressurized fluid and an exhaust (EX), said valve assembly including a three-position valve (312) having a first position (324) for pressurizing said first chamber and exhausting said second chamber, a second position (326) for pressurizing said second chamber and exhausting said first chamber and a third position (328) for pressurizing both said first and second chamber and override means (332) cooperative with said means for indicating the current engaged or not engaged condition of said main transmission section for urging said valve from the first to the third positions thereof when said main section is in the engaged condition thereof.

2. The valve assembly of claim 1 wherein said valve is constantly (330) biased to said first position and includes pilot means (352/412) responsive to said selector means to move said valve from said first to said second position thereof.

3. The valve assembly of claims 1 or 2 further comprising latching means (360, 362, 364, 366) cooperative with said means for indicating the current engaged or not engaged condition of said main transmission section to prohibit initial movement of said valve from said first position to said second position, from said third position to said second position and from said second position to either said first or third positions when said main transmission is engaged.

4. The valve of claim 3 wherein said latching means does not prohibit movement of said valve from said first to said third positions thereof or from said third to said first positions thereof.

5. The valve assembly of claims 1 or 2 wherein said main section includes a shaft (204) provided with at least one groove (210) and adjacent land each having a first axial position when said main section is engaged and a second axial position when said main section is not engaged, said means for indicating the current engaged or not engaged condition of said main section including a member (332) displaceable by said groove and adjacent land moving between the first and second positions thereof.

6. The valve assembly of claims 1 or 2 wherein said pilot means compresses a selectively pressurized and exhausted pilot conduit (236) fluidly communicating with a cylinder (354) in which a piston (352) associated with said valve is slidably received, said selector means (98/98A) effective to selectively pressurize and exhaust said pilot conduit.

7. The valve assembly of claim 3 wherein said pilot means compresses a selectively pressurized and exhausted pilot conduit (236) fluidly communicating with a cylinder (354) in which a piston (352) associated with said valve is slidably received, said selector means (98/98A) effective to selectively pressurize and exhaust said pilot conduit.

8. The valve assembly of claim 5 wherein said pilot means compresses a selectively pressurized and exhausted pilot conduit (236) fluidly communicating with a cylinder (354) in which a piston (352) associated with said valve is slidably received, said selector means (98/98A) effective to selectively pressurize and exhaust said pilot conduit.

9. The valve assembly of claims 1 or 2 wherein said main section includes a shaft (204A) including a cam surface portion having a first engageable diameter (402) when said transmission is on the high speed auxiliary section ratio and a second engageable diameter (404), different from said first engageable diameter, when said transmission is in the low speed auxiliary section ratio, said pilot means comprising a cam follower lever (412) engaging said cam surface portion.

10. The valve assembly of claim 3 wherein said main section includes a shaft (204A) including a cam surface portion having a first engageable diameter (402) when said transmission is on the high speed auxiliary section ratio and a second engageable diameter (404), different from said first engageable diameter, when said transmission is in the low speed auxiliary section ratio, said pilot means comprising a cam follower lever (412) engaging said cam surface portion.

11. A valve assembly (310) for use in a control system (300/400) for controlling a pressurized fluid operated shift actuator (220) for an auxiliary transmission section (14) of a compound transmission (10) including a main transmission section (12) having engaged and not-engaged positions connected in series with said auxiliary transmission section, said auxiliary transmission section including a selectable high speed ratio (direct) and a selectable low speed ratio (reduction), each of said ratios engageable by a synchronized jaw clutch assembly (92/128), said actuator (220) comprising a differential area piston (221) having a first piston surface (224) defining a first chamber (224A) and a second piston surface (222) defining a second chamber (222A), said first piston surface area being larger than an area ($A_{222}$) defined by said second piston surface, pressurization of said first chamber (224A) causing said actuator to urge said synchronized clutch assembly to engage said high-speed ratio and pressurization of said second chamber (222A) causing said actuator to urge said synchronized clutch assembly to engage said low-speed ratio, said system including means (204, 210) for indicating the current engaged or not engaged condition of said main transmission section, switch means (98/98A/412) for selecting a desired auxiliary section ratio, a common source (234) of pressurized fluid and an exhaust (EX), said valve assembly including a valve body (342) defining an axially extending bore (346) for slidably and sealingly receiving a valve spool (348), said valve body defining four ports opening to said bore, a first port (316) connected to said exhaust, a second port (318) connected to said source, a third port (320) connected to said second chamber and a forth port (322) connected to said first chamber, said valve spool having a first axial position (324) in said bore for establishing fluid communication between said first and third ports and between said second and forth ports, a second axial position (326) in said bore for establishing fluid communication between said first and fourth ports and between said second and third ports, and a third axial position (328) for establishing fluid communication between said second, third and fourth ports and blocking said first port from the other ports.

12. The valve assembly of claim 11 wherein said valve spool is constantly (330) biased to said first position and includes pilot means (352/412) responsive to said selector means to move said valve spool from said first to said second position thereof and override means (332) cooperative with said means for indicating the current engaged or not engaged condition of said main transmission section for urging said valve spool from the first to the third positions thereof when said main section is in the engaged condition thereof.

13. The valve assembly of claims 11 or 12 further comprising latching means (360, 362, 364, 366) cooperative with said means for indicating the current engaged or not engaged condition of said main transmission section to prohibit initial movement of said valve spool from said first position to said second position, from said third position to said second position and from said second position to either said first or third positions when said main transmission is engaged.

14. The valve of claim 13 wherein said latching means does not prohibit movement of said valve spool from said first to said third positions thereof or from said third to said first position.

15. The valve assembly of claims 11 or 12 said main section includes a shaft (204) provided with at least one groove (210) and adjacent land each having a first axial position when said main section is engaged and a second axial position when said main section is not engaged, said means for indicating the current engaged or not engaged condition of said main section including a member (332) displaceable by said groove and adjacent land moving between the first and second positions thereof.

16. The valve assembly of claims 11 or 12 wherein said pilot means compresses a selectively pressurized and exhausted pilot conduit (236) fluidly communicating with a cylinder (354) in which a piston (352) associated with said valve spool is slidably received, said selector means (98) effective to selectively pressurize and exhaust said pilot conduit.

17. The valve assembly of claim 13 wherein said valve spool is axially movable in said bore in a given axial direction from said first axial position to most axially displaced position, said most axially displaced position corresponding to said second axial position and said third axial position axially intermediate said first and second axial positions.

18. The valve assembly of claim 17 further comprising biasing means (330) constantly urging said valve spool to said first axial position thereof, pilot operated means (352/355/412) responsive to said selector means to bias said valve spool to said second position thereof and override means responsive to said means for sensing the engaged and not engaged conditions of said main transmission section for engaging said valve spool and axially displacing it from the first to the third axial positions thereof when said main transmission section is engaged.

19. The valve assembly of claim 18 wherein said biasing means is a spring, said pilot operated means is a piston and said override means is a lever having one end engaging lands and grooves (210) on a shaft (204) the axial position of which is indicative of the engaged or not engaged condition of said main section.

20. The valve assembly of claim 19 further comprising a detent member (362) radially movable in said housing, a first elongated detent groove (364) in said spool aligning with said detent member in said first to said third axial positions of said spool and a second detent groove (366) aligning with said detent member when said spool is in said second axial position, and a collet member (360) having a first position allowing radial movement of said detent member and a second position for forcing said detent member radially inwardly to be received in the groove aligned therewith, said collet resiliently biased to said first position thereof and displaced to said second position thereof in response to said main transmission being in the engaged condition thereof.

21. The valve assembly of claim 20 wherein said override means is effective to move said collet from said first to said second position thereof.

22. The valve assembly of claim 18 wherein said biasing means is a spring, and said override means is a lever (352) having one end engaging lands and grooves (210) on a shaft (204) the axial position of which is indicative of the engaged or not engaged condition of said main section.

23. The valve assembly of claim 22 wherein said shaft (204A) includes a cam surface portion having a first diameter (402) when said transmission is on the high speed auxiliary section ratio and a second diameter (404), different from said first diameter, when said transmission is in the low speed auxiliary section ratio, said pilot means comprising a cam follower lever (412) engaging said cam surface portion.

24. The valve assembly of claim 22 further comprising a detent member (362) radially movable in said housing, a first elongated detent groove (364) in said spool aligning with said detent member in said first to said third axial positions of said spool and a second detent groove (366) aligning with said detent member when said spool is in said second axial position, and a collet member (360) having a first position allowing radial movement of said detent member and a second position for forcing said detent member radially inwardly to be received in the groove aligned therewith, said collet resiliently biased to said first position thereof and displaced to said second position thereof in response to said main transmission being in the engaged condition thereof.

25. The valve assembly of claim 23 further comprising a detent member (362) radially movable in said housing, a first elongated detent groove (364) in said spool aligning with said detent member in said first to said third axial positions of said spool and a second detent groove (366) aligning with said detent member when said spool is in said second axial position, and a collet member (360) having a first position allowing radial movement of said detent member and a second position for forcing said detent member radially inwardly to be received in the groove aligned therewith, said collet resiliently biased to said first position thereof and displaced to said second position thereof in response to said main transmission being in the engaged condition thereof.

* * * * *